(12) United States Patent
Winstead

(10) Patent No.: US 11,977,964 B1
(45) Date of Patent: May 7, 2024

(54) SYSTEMS AND METHODS FOR USING A MACHINE LEARNING MODEL TO DOCUMENT INCONSISTENCIES

(71) Applicant: PJM PRO, LLC, Austin, TX (US)

(72) Inventor: Rees Winstead, Austin, TX (US)

(73) Assignee: PJM PRO, LLC, Austin, TX (US)

( * ) Notice: Subject to any disclaimer, the term of this patent is extended or adjusted under 35 U.S.C. 154(b) by 0 days.

(21) Appl. No.: 18/135,117

(22) Filed: Apr. 14, 2023

(51) Int. Cl.
*G06N 20/00* (2019.01)
*G06F 16/215* (2019.01)

(52) U.S. Cl.
CPC .......... *G06N 20/00* (2019.01); *G06F 16/215* (2019.01)

(58) Field of Classification Search
CPC .............................. G06N 20/00; G06F 16/215
USPC ....................................................... 707/690
See application file for complete search history.

(56) References Cited

U.S. PATENT DOCUMENTS

| | | | | |
|---|---|---|---|---|
| 10,896,421 | B2 * | 1/2021 | Adjaoute | G06Q 20/384 |
| 2008/0086432 | A1 * | 4/2008 | Schmidtler | G06F 16/353 |
| | | | | 706/14 |
| 2019/0096012 | A1 * | 3/2019 | Sankey | G06Q 50/163 |
| 2019/0171944 | A1 * | 6/2019 | Lu | G06N 5/022 |
| 2020/0073882 | A1 * | 3/2020 | Guggilla | G06N 3/044 |
| 2022/0012672 | A1 * | 1/2022 | Inman | G06F 21/32 |
| 2022/0036063 | A1 * | 2/2022 | Bhuyan | G06V 30/416 |
| 2022/0159129 | A1 * | 5/2022 | Abe | H04N 1/00082 |
| 2022/0414539 | A1 * | 12/2022 | Oren | G06F 11/3447 |
| 2023/0106289 | A1 * | 4/2023 | Maiman | G06F 21/45 |
| | | | | 726/5 |

\* cited by examiner

*Primary Examiner* — Cam Linh T Nguyen
(74) *Attorney, Agent, or Firm* — DICKINSON WRIGHT PLLC

(57) ABSTRACT

Disclosed herein are exemplary implementations of systems and methods for utilizing a machine learning model to identify logical inconsistencies. An aspect of the disclosed embodiments includes a method comprises receiving, via a network, a document related to a user; receiving, from the machine learning model, a predetermined label and a value associated with the predetermined label wherein the value is associated with a location on the document; storing the predetermined label and the value associated with the predetermined label in a structured data object; identifying, based a consistency rule, a logical inconsistency in the structured data object; generating a visualization based on the logical inconsistency and providing, at a display device, the structured data object, wherein the structured data object includes the visualization of the logical inconsistency.

14 Claims, 21 Drawing Sheets

FIG. 7

| Invoice Number | Vendor | Job Number | PO Number | Invoice Date | Extended Price |
|---|---|---|---|---|---|
| Invoice Number | Vendor | Job Number | PO Number | Invoice Date | Extended Price |
| 1111059-00 | TechLine Pipe | 853 | 2020768 - WTR | 03/26/2021 | 80,868.35 |
| 1115394-00 | TechLine Pipe | 853 | 2020768 - RETURN | 08/19/2021 | -14,853.24 |
| 1121614-00 | TechLine Pipe | 4226-1 | R1945 | 04/01/2022 | 11,265.54 |
| 1121614-00 | TechLine Pipe | 4158-1 | R1945 | 04/05/2022 | 378.88 |
| 1121614-00 | TechLine Pipe | 4158-1 | R1945 | 04/06/2022 | 227.33 |
| 1121826-00 | TechLine Pipe | 4011-1 | 4011-1 | 04/05/2022 | -7,260.00 |
| 1123708-00 | TechLine Pipe | 853 | 2022854-318 | 06/09/2022 | 80,428.46 |
| 1127512-00 | TechLine Pipe | 4226-1 | R4184 | 09/29/2022 | 26,808.00 |
| 1130677-00 | TechLine Pipe | 905 | 2022905-316 | 01/13/2023 | 7,598.67 |
| 1130679-00 | TechLine Pipe | 905 | 2022905-313 | 01/13/2023 | 21,291.15 |

Showing 1 To 10 Of 24 Entries

Edit Quote Line Items

Show All Entries

| Job Number | Quote Number | Line Number | Part Number | Description | Quantity | Unit | Unit Price | Extended Price |
|---|---|---|---|---|---|---|---|---|
| Job Number | Quote Number | Line Number | Part Number | Description | Quantity | Unit | Unit Price | |
| 853 | 1128287-00 | 1 | M1SL12D | Sleeve, 12",Solid, Long, MJ, Domestic | 1 | EA | 369.12 | 369.12 |
| 853 | 1128287-00 | 2 | 829-030 | PVC Coupling 3" ,SCH 80, S x S | 5 | EA | 22.50 | 112.50 |
| 853 | 1128287-00 | 3 | 12FA-BC | 12" FOSTER ADAPTER WITH ACCESSORIES | 1 | EA | 276.07 | 276.07 |
| 853 | 1128287-00 | 4 | M1B4512D | 12" DI MJ 45 BEND CEMENT LINED - DOMESTIC | 2 | EA | 467.43 | 943.86 |
| 853 | 1128287-00 | 5 | 3/4ATI0 | 3/4" X 10' ZINC PLATED ALL THREAD ROD | 2 | EA | 30.84 | 61.68 |
| 853 | 1128287-00 | 6 | 3/4ATNUT | 3/4" ZINC HEAVY HEX NUT FOR ALL THREAD BOX QUANTITY: 25 | 8 | EA | 0.33 | 2.64 |
| 853 | 1128287-00 | 7 | 3/4ATWASH | 3/4" ZINC WASHER FOR ALL THREAD BOX QUANTITY: 25 | 8 | EA | 0.41 | 3.28 |
| 853 | 1128287-00 | 8 | UFR1390-C-12-RED-RB-1 | 12" COA SPLIT BELL JOINT RESTRAINT C900 RED | 1 | EA | 296.51 | 296.51 |
| 853 | 1128287-00 | 9 | PW29X200 | POLYWRAP, 29" x 200",* MIL COA PRINTED | 1 | EA | 165.01 | 165.01 |
| 4108-1 | 1128018-00 | 1 | BBU0807 | 2" X 1-1/2" BRASS HEX BUSHING LF B-QUANTITY: 20 | 6 | EA | 12.81 | 76.86 |
| 4108-1 | 1128018-00 | 2 | B-L9008 | 2" FIP X FIP BRASS 90 DEG BEND LF BOX QUANTITY: 20 | 12 | EA | 37.50 | 450.00 |
| 4108-1 | 1128018-00 | 3 | C84-77GNL | 2" MIP X GRIP JOINT, FORD NO LEAD | 12 | EA | 98.09 | 1,177.08 |
| 4108-1 | 1128018-00 | 4 | INSERT-54 | 1.5" SS INSERT | 12 | EA | 3.75 | 45.00 |
| 4108-1 | 1128018-00 | 5 | PW18X200 | POLYWRAP 18" x 200' 8 MIL COA PRINTED | 4 | EA | 106.25 | 425.00 |

| Job Number | Vendor | Part Number | Description | Quoted Price | Invoiced Price | Quoted Quantity | Invoiced Quantity | Quantity Remaining | Price Difference | Dollars Remaining | Total Amount Shipped |
|---|---|---|---|---|---|---|---|---|---|---|---|
| 4108-J | Techline Pipe | MJB1106 | 6" DI MJ 11.25 DEG Bend C153 Cement Lined | 87.50 | 87.50 | 4 | 4 | 0 | 0.00 | 0.00 | 350.00 |
| 4108-J | Techline Pipe | ZMGL9008 | Galv 90 Deg Elbow, 2" | 17.50 | 17.50 | 18 | 4 | 14 | 0.00 | 245.00 | 70.00 |
|  |  |  |  |  |  |  |  |  |  |  | Σ=420.00 |

*1600*

Remaining From Quote

Σ = 26,221.31

Show 10 Entries

| Job Number | Vendor | Article Number | Description | Quoted Quantity | OverShipped From Quote | Invoiced Quantity | Quantity Remaining | Unit Price | Dollars Remaining |
|---|---|---|---|---|---|---|---|---|---|
| Job Number | Vendor | Article Number | Description | Quoted Quantity | | Invoiced Quantity | Quantity Remaining | Unit Price | Dollars Remaining |
| 24746 | Tiki Trucking | 94559 | Centex-Buda Quarry | 1,250 | | | 1,250 | 8.60 | 10,750.00 |
| 853 | Techline Pipe | 3/4AT10 | 3/4" x 10' ZINC PLATED ALL THREAD ROD | 2 | | | 2 | 30.84 | 61.68 |
| 853 | Techline Pipe | 3/4ATNUT | 3/4" ZINC HEAVY HEX NUT FOR ALL THREAD BOX QUANTITY: 25 | 8 | | | 8 | 0.33 | 2.64 |
| 853 | Techline Pipe | 3/4ATWASH | 3/4" ZINC WASHER FOR ALL THREAD BOX QUANTITY: 25 | 8 | | | 8 | 0.41 | 3.28 |
| 853 | Techline Pipe | 829-030 | PVC Coupling, 3",SCH 80, S x S | 5 | | | 5 | 22.50 | 112.50 |
| 853 | Techline Pipe | MJB4512D | 12' DI MJ 45 BEND CEMENT LINED - DOMESTIC | 2 | | | 2 | 467.43 | 934.86 |
| 853 | Techline Pipe | MSLL12D | Sleeve, 12", Solid, Long, MJ, Domestic | 1 | | | 1 | 369.12 | 369.12 |
| 853 | Techline Pipe | PW29X200 | POLYWRAP, 29" x 200', 8 MIL COA PRINTED | 1 | | | 1 | 165.01 | 165.01 |
| 853 | Techline Pipe | UFR1390-C-12_RED-RB-1 | 12' COA SPLIT BELL JOINT RESTRAINT C900 RED | 1 | | | 1 | 296.51 | 296.51 |
| 4108-1 | Techline Pipe | 200RPC | 4" C900 PVC EBAA MEGALUG W / ACC | 4 | | | 4 | 62.50 | 250.00 |
| | | | | | | | | | Σ = 26,221.31 |

Showing 1 To 10 Of 33 Entries

| Job Number | Invoice Number | Line Number | PO Number | Return Date | Vendor | Part Number | Description | Quantity | Unit | Unit Price | Extended Price |
|---|---|---|---|---|---|---|---|---|---|---|---|
| Job Number | Invoice Number | Line Number | PO Number | Return Date | Vendor | Part Number | Description | Quantity | Unit | Unit Price | Extended Price |
| 853 | 1115394-00 | 1 | 2020768-Return | 08/19/2021 | Techline Pipe | DR14-08 | 8" DR14 Blue C900 PVC Pipe, 305 PSI | -180.00 | FT | 9.54 | -1,717.35 |
| 853 | 1115394-00 | 2 | 2020768-Return | 08/19/2021 | Techline Pipe | 2201600 | 16" EJIW RW MJ X MJ Gate Valve OL | -1.00 | EA | 4,163.36 | -4,163.36 |
| 853 | 1115394-00 | 3 | 2020768-Return | 08/19/2021 | Techline Pipe | 2200800 | 8" MJ X MJ RW OL Gate Valve, EJIW | -8.00 | EA | 629.45 | -5,035.60 |
| 853 | 1115394-00 | 4 | 2020768-Return | 08/19/2021 | Techline Pipe | SLDEXP08 | 8" DIP MJ Restraint Kit, Epoxy Coated Gland | -36.00 | EA | 35.20 | -1,267.29 |
| 853 | 1115394-00 | 5 | 2020768-Return | 08/19/2021 | Techline Pipe | SLDEXP12 | 12" DIP MJ Restraint Kit, Epoxy Coated Gland | -2.00 | EA | 73.46 | -146.91 |
| 853 | 1115394-00 | 6 | 2020768-Return | 08/19/2021 | Techline Pipe | SLDEXP16 | 16" Dip MJ Restraint Kit, Epoxy Coated Gland | -2.00 | EA | 125.63 | -253.25 |
| 853 | 1115394-00 | 7 | 2020768-Return | 08/19/2021 | Techline Pipe | C5 | COA Valve Box Boot | -5.00 | EA | 38.00 | -189.99 |
| 853 | 1115394-00 | 8 | 2020768-Return | 08/19/2021 | Techline Pipe | MJB4506 | 6"DI MJ 45 DEG Bend Cement Lined C153 | -4.00 | EA | 61.24 | -244.94 |
| 853 | 1115394-00 | 9 | 2020768-Return | 08/19/2021 | Techline Pipe | MJT0806 | 8" X 6" DI MJ X MJ TEE C153 Cement Lined | -1.00 | EA | 75.21 | -75.21 |
| 853 | 1115394-00 | 10 | 2020768-Return | 08/19/2021 | Techline Pipe | MJC08 | 8" DI MJ Solid Cap C153 Cement Lined | -1.00 | EA | 33.93 | -33.93 |
| | | | | | | | | | | | Σ=-20,979.40 |

Showing 1 To 10 Of 17 Entries

SYSTEMS AND METHODS FOR USING A MACHINE LEARNING MODEL TO DOCUMENT INCONSISTENCIES

TECHNICAL FIELD

The present application relates to computer-implemented systems and methods of automatically identifying inconsistencies in large volumes of financial documents. A machine learning model can utilize user input to improve the identification of the inconsistencies.

BACKGROUND

The transcription of written text into a digital form often requires a human to look at the written text and enter the content of the text into a computer via an input device. This form of text transcription is very time consuming and labor intensive. To decrease the time and labor required for human text transcription, systems have been developed for automatically transcribing text by means of a camera and a computer. These optical character recognition (OCR) systems can recognize the content of a physical document.

The practicality of such systems is limited because the OCR system may be able to recognize the text but it does not understand or analyze the content of the document.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method for using a machine learning model to identify a logical inconsistency may include receiving, via a network, a document related to a user. A method for using a machine learning model to identify a logical inconsistency may also include receiving, from the machine learning model, a predetermined label and a value associated with the predetermined label where the value is associated with a location on the document. A method for using a machine learning model to identify a logical inconsistency may furthermore include storing the predetermined label and the value associated with the predetermined label in a structured data object. A method for using a machine learning model to identify a logical inconsistency may include identifying, a logical inconsistency may include in the structured data object. A method for using a machine learning model to identify a logical inconsistency may moreover include generating a visualization based on the logical inconsistency may include. A method for using a machine learning model to identify a logical inconsistency may also include providing, at a display device, the structured data object, where the structured data object includes the visualization of the logical inconsistency may include. Other embodiments of this aspect include corresponding computer systems, apparatus, and computer programs recorded on one or more computer storage devices, each configured to perform the actions of the methods.

Implementations may include one or more of the following features. The method further may include: storing an identification inconsistency may include, where the identification inconsistency may include is identified when a confidence score generated by the machine learning model for a prestored location of a value associated a predetermined label in the structured data object is less than a first predetermined threshold and greater than a second predetermined threshold; and receiving, from the user, a selection of the location of the value associated with the predetermined label for the machine learning model and storing the value associated with the predetermined label. The method further may include: generating one or more training datasets based on the document related to the user, the predetermined label, the prestored location of the value associated with the predetermined label, and the user selection of the location of the value associated with the predetermined label; and training the machine learning model, based on the one or more training datasets, to more accurately identify the location of the value associated with predetermined label. The method further may include: generating a may include rule when the user interacts with the visualization and selects a may include resolution option; and storing the may include rule and resolving a future inconsistency may include based on the may include rule. The method where the document is one of where the document is one of: a price quote document, an invoice document, and a delivery confirmation document. The method where the inconsistency rule may include: comparing a quantity ordered with a quantity delivered, comparing a quoted price per unit to an invoiced price per unit, and comparing an invoiced price per unit to an industry average price per unit. The method further may include: generating, based on monitoring of the structured data object content, a report about changes to the structured data object content over a predetermined interval; and sending, to a remote computing device, the report. The method where storing the value in the structured data object further includes where storing the value in the structured data object further includes: generating a first unique identification value for the document and a second unique identification value for the value. The method further may include: sending, in response to identifying a logical inconsistency may include, a message to a remote computing device based in part on the logical inconsistency may include and the may include rule associated with the logical inconsistency may include. Implementations of the described techniques may include hardware, a method or process, or a computer tangible medium.

Another aspect of the disclosed embodiments includes a system that includes a processing device and a memory communicatively coupled to the processing device and capable of storing instructions. The processing device executes the instructions to perform any of the methods, operations, or steps described herein.

Another aspect of the disclosed embodiments includes a tangible, non-transitory computer-readable medium storing instructions that, when executed, cause a processing device to perform any of the methods, operations, or steps disclosed herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 generally illustrates an example interface according to the principles of this present disclosure.

FIG. 8 generally illustrates another example interface according to the principles of this present disclosure.

FIG. 9 generally illustrates interface for a quote header view in accordance with one or more aspects of the present disclosure.

FIG. 10 generally illustrates interface for a quote line item view in accordance with one or more aspects of the present disclosure.

FIG. 11 generally illustrates interface for an order look up view in accordance with one or more aspects of the present disclosure.

FIG. 12 generally illustrates interface for a quantity check view in accordance with one or more aspects of the present disclosure.

FIG. 13 generally illustrates interface for a total cost quoted view in accordance with one or more aspects of the present disclosure.

FIG. 14 generally illustrates interface for a total amount shipped view in accordance with one or more aspects of the present disclosure.

FIG. 15 generally illustrates interface for a view of products shipped at quoted price in accordance with one or more aspects of the present disclosure.

FIG. 16 generally illustrates interface for a remaining material from quote view in accordance with one or more aspects of the present disclosure.

FIG. 18 generally illustrates interface for an overcharged from quote view in accordance with one or more aspects of the present disclosure.

FIG. 21 generally illustrates interface for a total credits view in accordance with one or more aspects of the present disclosure.

NOTATION AND NOMENCLATURE

Figure 1:
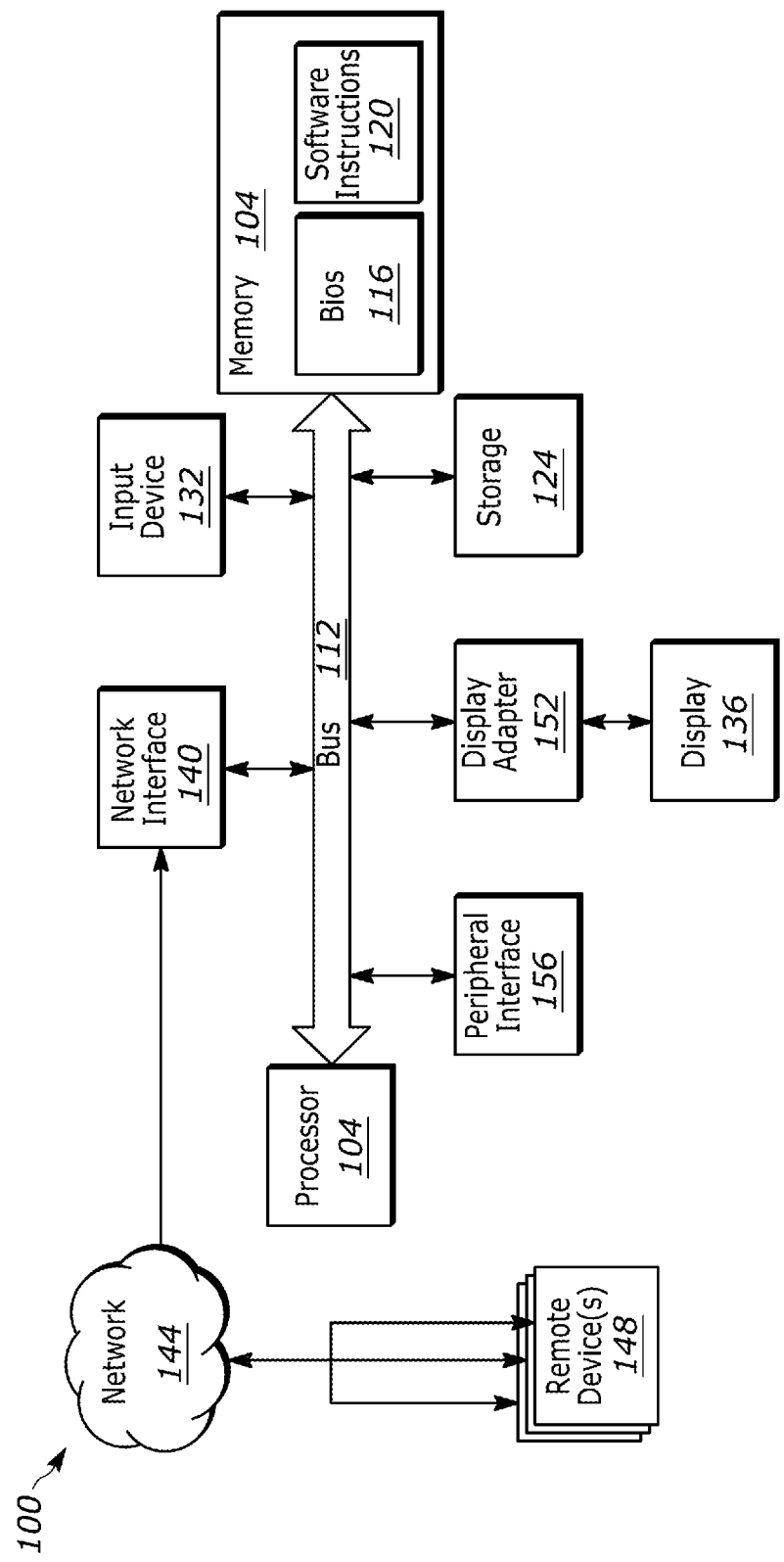
FIG. 1 generally illustrates a computer-implemented system according to the principles of the present disclosure.

Various terms are used to refer to particular system components. Different companies may refer to a component by different names—this document does not intend to distinguish between components that differ in name but not function. In the following discussion and in the claims, the terms "including," "and the like," and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one. Spatially relative terms, such as "inner," "outer," "beneath," "below," "lower," "above," "upper," "top," "bottom," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the processor of a device is referred to as having multiple inputs, not all the inputs are required. Thus, the example term "and the like" can encompass at least one of the listed inputs, at least one similar non-listed input, or some combination thereof.

DETAILED DESCRIPTION

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Determining whether or not inconsistencies exist between multiple documents over a long period of time becomes exponentially more difficult as projects grow in size and time to completion. Often, vendors provide billing documents in a different proprietary layout based on the type of billing document as well as a different format (e.g., .PDF, .DOC, .DOCX, .HTML, .XLS, .JPG, .TXT, . any appropriate document format). For example, a first vendor may sends all invoices in a specific layout, while using a different layout for shipping confirmations. The first vendor may further utilize .PDF documents for invoices while using .HTML documents for shipping confirmations; those different documents formats also utilizing different layouts. Other vendors may use different formats and layouts across their billing documents. Thus, finding the same information across different billing documents and vendors further increases the difficulty of finding specific values on the document.

Managers of such projects typically track of all the billing documents and compare them to billing documents received over the course of a project in order to spot any inconsistencies as they occur or at the end of the project. Managers of such projects typically track billing documents received over a period and may review such documents to identify data inconsistencies. Such management of billing documents may require organizing billing documents based on type, vendor, and/or time. Further, management is required to keep track of billing document updates, multiple versions of the same billing document, and changes to a vendor's proprietary format for a billing document. Assuming document management is successful at this scale for categorizing the billing documents, they must be further compared and analyzed to locate inconsistencies. In some embodiments, the systems and methods described herein may be configured to analyze all stored values for inconsistencies based on comparisons with other stored values in view of some predetermined consistency logic.

Accordingly, systems and methods, such as those described herein, may be configured to identify logical inconsistencies in such various document formats, may be desirable. In some embodiments, the systems and methods described herein may receive multiple billing documents from multiple vendors over a period of time. Additionally, or alternatively, the systems and methods described herein may be configured to a machine learning OCR systems to determine where a particular value is on a page, the coordinates of that value on the page, which label is associated with that value, and a conversion of an image of a value to the value.

In some embodiments, the systems and methods described herein may be configured to automatically output, to a user, discovered inconsistencies. The systems and methods described herein may be configured to generate a report for the user that indicates identified inconsistencies and information related to the inconsistency. The information related to the inconsistency may include screen shots from billing documents related to the inconsistency.

As is generally illustrated in FIG. 1 a computing system 100 that can perform any one or more of the methods described herein in accordance with one or more aspects of the present disclosure. Computing system 100 includes a processor 104 and a memory 108 that communicate with each other, and with other components, via a bus 112. The processor 104 may be a single core processor, a multi core processor, or a network of processors working together. Bus 112 may include any of several types of bus structures including, but not limited to, a memory bus, a memory controller, a peripheral bus, a local bus, and any combinations thereof, using any of a variety of bus architectures.

Memory 108 may include various components (e.g., machine-readable media) including, but not limited to, a random-access memory component, a read-only component, and any combinations thereof. In one example, a basic input/output system 116 (BIOS), including basic routines that help to transfer information between elements within computing system 100, such as during start-up, may be stored in memory 108. Memory 108 may also include (e.g., stored on one or more machine-readable media) instructions 120 (e.g., software) embodying any one or more of the aspects and/or methodologies of the present disclosure. In another example, memory 108 may further include any number of program modules including, but not limited to, an operating system, one or more application programs, other program modules, program data, and any combinations thereof.

Computing system 100 may also include a storage device 124. Examples of a storage device (e.g., storage device 124) include, but are not limited to, a hard disk drive, a magnetic disk drive, an optical disc drive in combination with an optical medium, a solid-state memory device, and any combinations thereof. Storage device 124 may be connected to bus 112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 124 (or one or more components thereof) may be removably interfaced with computing system 100 (e.g., via an external port connector (not shown)). Particularly, storage device 124 and an associated machine-readable medium 128 may provide nonvolatile and/or volatile storage of machine-readable instructions, data structures, program modules, and/or other data for computing system 100. In one example, instructions 120 may reside, completely or partially, within machine-readable medium 128. In another example, instructions 120 may reside, completely or partially, within processor 104.

Computing system 100 may also include an input device 132. In one example, a user of computing system 100 may enter commands and/or other information into computing system 100 via input device 132. Examples of an input device 132 includes, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 132 may be interfaced to bus 112 via any of a variety of interfaces (not shown) including, but not limited to, a serial interface, a parallel interface, a game port, a USB interface, a FIREWIRE interface, a direct interface to bus 112, and any combinations thereof. Input device 132 may include a touch screen interface that may be a part of or separate from display device 136, discussed further below. Input device 132 may be utilized as a user selection device for selecting one or more graphical representations in a graphical interface as described above.

A user may also input commands and/or other information to computing system 100 via storage device 124 (e.g., a removable disk drive, a flash drive, etc.) and/or network interface device 140. A network interface device, such as network interface device 140, may be utilized for connecting computing system 100 to one or more of a variety of networks, such as network 144, and one or more remote devices 148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 144, may employ a wired and/or a wireless mode of communication. In general, any network topology may be used. Information (e.g., data, instructions 120, etc.) may be communicated to and/or from computing system 100 via network interface device 140.

Computing system 100 may further include a video display adapter 152 for communicating a displayable image to a display device, such as display device 136. Examples of a display device include, but are not limited to, a liquid crystal display (LCD), a cathode ray tube (CRT), a plasma display, a light emitting diode (LED) display, and any combinations thereof. Video display adapter 152 and display device 136 may be utilized in combination with processor 104 to provide graphical representations of aspects of the present disclosure. In addition to a display device, computing system 100 may include one or more other peripheral output devices including, but not limited to, an audio speaker, a printer, and any combinations thereof. Such peripheral output devices may be connected to bus 112 via a peripheral interface 156. Examples of a peripheral interface include, but are not limited to, a serial port, a USB connection, a FIREWIRE connection, a parallel connection, and any combinations thereof.

Figure 2:
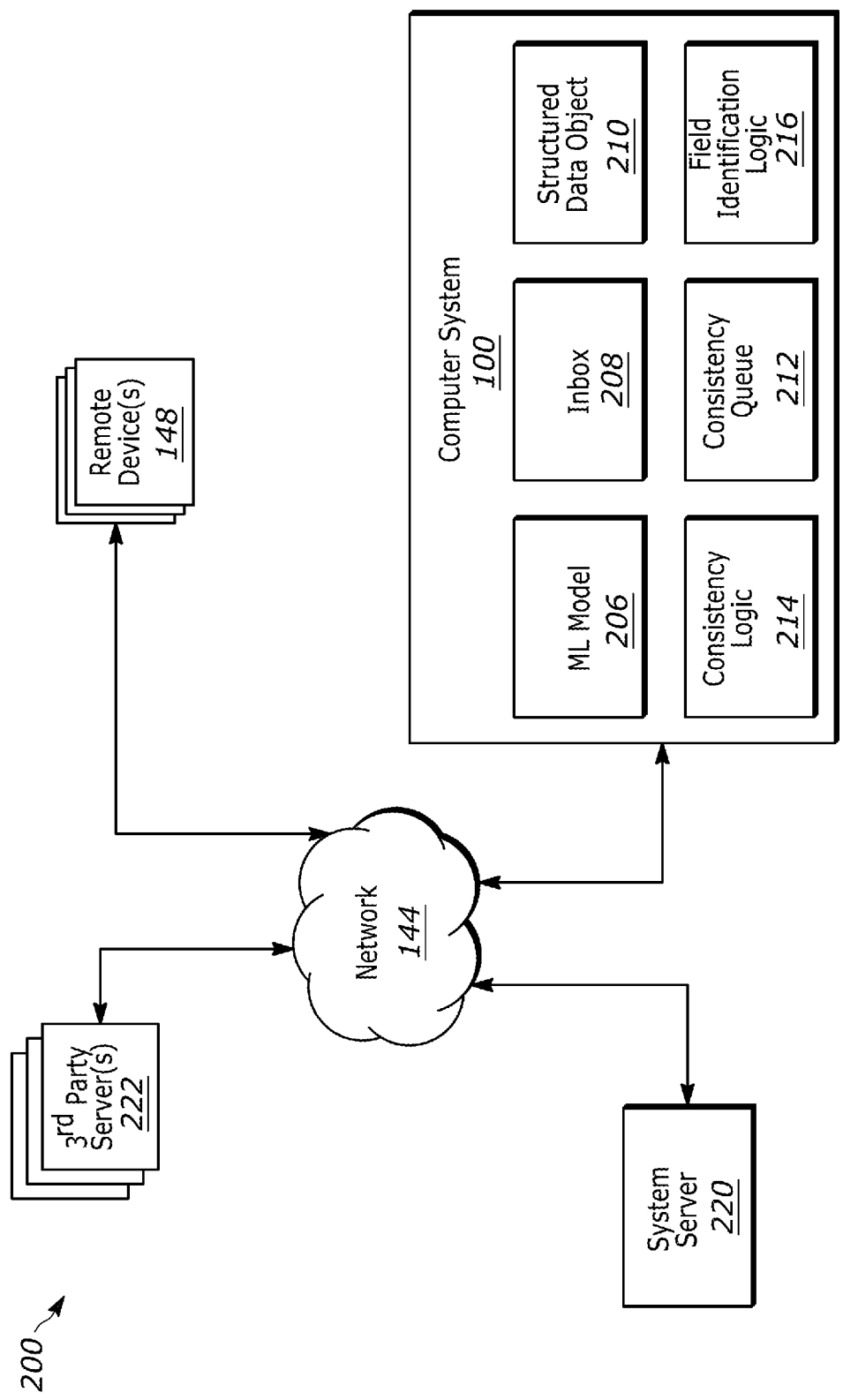
FIG. 2 generally illustrates a block diagram of an embodiment of the computer-implemented system for accepting user input to more accurately identify logical inconsistencies according to the principles of the present disclosure.

As is generally illustrated in FIG. 2 a computing environment in accordance with one or more aspects of the present disclosure. Computing environment 200 may include computing system 100 which further comprises machine learning model 206, inbox 208, structured data object 210, consistency logic 214, consistency queue 212, and field identification logic 216. The machine learning model 206 may be a pretrained machine learning algorithm (e.g., classification model, regression model, clustering model, and the like), a deep learning neural network (e.g., multi-layer perceptron, convolution neural network, recurrent neural network, and the like), or some combination thereof. The inbox 208 may be used to collect and store documents sent to the user by $3^{rd}$ parties.

The structured data object 210 may be used to store data retrieved after applying optical character recognition (OCR) to a document intended for the user. The OCR may retrieve a value as well as a tag associated with that value, which can both be stored in the structured data object 210 while maintaining their association with one another. Consistency logic 214 may contain a quantity of rules used to determine consistency in the billing documents received by the user. For example, a consistency rule may check to make sure the price quoted for a product matches the price charged for that product, or that the quantity ordered matches the quantity received. The consistency rules may further include ranges and threshold to determine matches within a predetermined level of accuracy. Further, new rules may be generated based on input by a user or automatically generated by the computing system 100 based on user behavior.

Consistency queue 212 may contain identification inconsistencies identified by the systems and methods described herein. An inconsistency may lower than a first threshold but higher than a second threshold, wherein, the inconsistency is added to the consistency queue in order for a human to make a final determination. When the inconsistency is below both thresholds than no action is taken and when the inconsistency is above both thresholds, it is automatically confirmed as an inconsistency.

Field identification logic 216 may include a quantity of predetermined labels and associated guidance in order to identify values associated with those predetermined labels in billing documents received by the user. Field identification logic 216 may accept revisions or new entries from a human user or through iterations of machine learning training.

Computing system 100 may connect to network 144, network 144 may be an information network such as the Internet. The computing device may communicate with other devices through network 144 such as one or more remote device 148, system server 220, and one or more $3^{rd}$ party server 222. Systems server 220 may be a network of one or more servers and computing devices working in tandem. The computing system 100 may use the system server as a source of cloud storage for any of the data it stores. Further, the system server 220 may provide additional processing power when executing tasks. $3^{rd}$ party server 222 may be the source of documents being received by the user.

Figure 3:
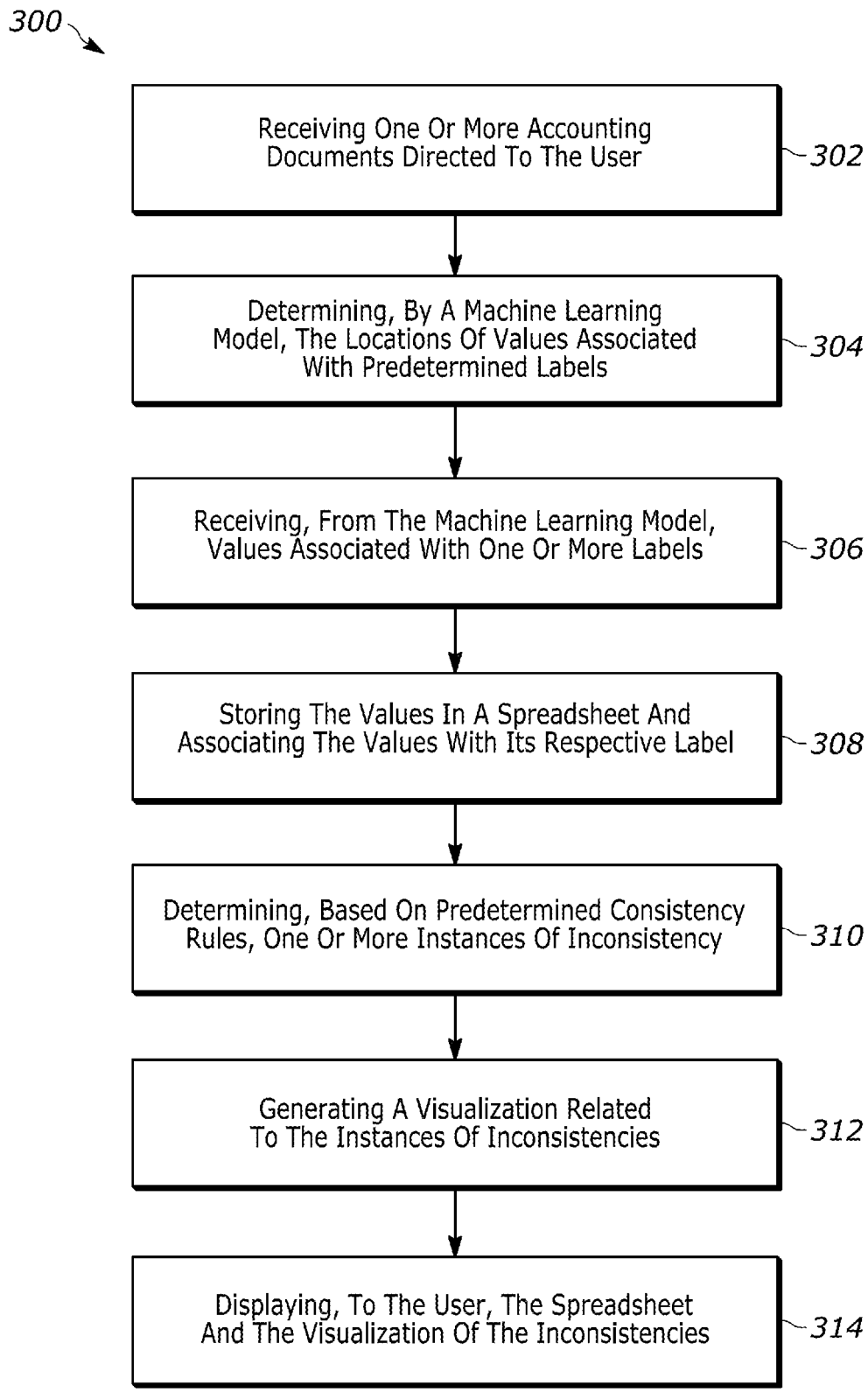
FIG. 3 generally illustrates a flow diagram of a method for receiving billing documents and presenting inconsistencies to a user according to the principles of this present disclosure.

FIG. 3 generally illustrates a document inconsistency identification method 300 in accordance with one or more aspects of the present disclosure. The method 300 may be configured to receive billing documents and present inconsistencies to the user. In some embodiments, the inbox 208 may receive the billing documents or the billing documents may be scanned into the computing system 100 using a peripheral device in communication with the computing system 100. The method 300 may be performed on the computing system 100 and executed by processor 104. Additionally, or alternatively, the computing system 100 may use the machine learning model 206 to perform at least a portion of the method 300.

In some embodiments, the method 300 may store the billing documents on a memory associated with the computing system 100, or at a device accessible over network 144. In some embodiments the value of the location may be a prestored location such as the computing system 100 or any suitable computing device. The billing documents may be accessed from system server 220, from any one of $3^{rd}$ party server 222 or other servers available over the Internet or other suitable network. The $3^{rd}$ party servers 222 may include a storage service (e.g., AMAZON WEB SERVICE, MICROSOFT AZURE, GOOGLE CLOUD PLATFORM, and the like).

At 302, the method 300 receives one or more billing documents over a network. For example, the computing system 100 may be connected to the Internet and receive billing documents from multiple sources available on the Internet and/or via any other suitable network. The sources may include email, short message service (SMS), list serve, chat services, really simple syndication (RSS) feeds, internet relay chat (IRC), fax to OCR services, mail to OCR services, and any other form of internet communication that sends a document to the user. The billing documents may include one or more of an invoice, a price quote, a delivery confirmation, credit memos, debit memos, pro forma invoices, cancellation documents, and any suitable billing document.

The method 300 may determine, based on a pretrained machine learning model 206, the location inside the billing document associated with one or more predetermined labels. In some embodiments, the predetermined labels may include, but are not limited to, fixed price, unit price, unit quantity, time spent, invoice number, contact details, site details, quantity per hour, subtotal, discount, tax rate, total tax, balance due, remaining balance, balance overdue, remarks, and payment instructions. For example, the machine learning model 206 may be trained to find values in billing documents related to predetermined labels.

In some embodiments, the method 300 may be configured so the predetermine labels may further contain logic related to the location of the value related to the label. For example, the predetermined label for total balance has an outsized chance of being located near the bottom right of the last page of the billing document. The location logic may be refined with each iteration making identification more accurate and faster over time.

In some embodiments, the method 300 may be configured so the predetermined labels may be associated with a specific $3^{rd}$ party. In some embodiments, specific $3^{rd}$ parties having similar location logic may be clustered together. The level of similarity determines the tightness of the clustering. For example, a vendor will use the same form to create the billing document, so values will be in the same position from document to document. When the $3^{rd}$ party is identified, the machine learning model 206 will have a high confidence the location of the value associated with the predetermined label will be in the same position as previous billing documents from the same vendor.

In some embodiments, the method 300 may be configured so the machine learning model 206 may be trained using training data. The training data may include labeled inputs (e.g., billing documents) that are mapped to labeled outputs (e.g., the location of a value on the billing document associated with a predetermined label). Such training may be referred to as supervised learning. Additional types of training may be used, such as unsupervised learning where the training data is not labeled, and the machine learning model 206s group clusters of the unlabeled training data based on patterns. The patterns may relate to certain characteristics being associated with certain probabilities of eligibilities than other probabilities. In addition, reinforcement learning may be used to train the one or more machine learning model 206s, where a reward is associated with the models correctly determining a probability for one or more characteristics, such that the machine learning model 206s reinforces (e.g., adjusts weights and/or parameters) selecting that probability for those characteristics. In some embodiments, some combination of supervised learning, unsupervised learning, and/or reinforcement learning may be used to train the one or more machine learning model 206s.

At 306, the computing system 100 receives from the machine learning model 206, values associated with the one or more labels. At 308, the computing system 100 stores the values associated with the one or more labels in structured data object 210. In some embodiments, the structured data object 210 may be a spreadsheet file where the placement of the value in the spreadsheet denotes its association with its predetermined label. In some embodiments, each billing document is In some embodiments, the method 300 may be configured so the billing documents may be stored at the computing system 100, or at a device accessible over network 144. The billing documents may be accessed from system server 220, from any one of $3^{rd}$ party server 222, or other servers available over the Internet.

At 310, the computing system 100 may parse the structured data object after each update, after some predetermined interval, or any suitable trigger. In some embodiments the structured data object may be parsed and, based on predetermined logical consistency rules, inconsistencies may be identified. In some embodiments, logical consistency rules may be generated by the user, may be created by the developer, or may be modified based on an existing logical consistency rule. A logical consistency rule may be a logical check on a specific value by comparing it to one or more related values or predetermined values. For example, a logical consistency rule may check that the quoted price of a product matches the price charged. Another example includes, a logical consistency rule which may check that the number of products ordered match the number or products received. Some logical consistency rules may be triggered by receiving a specific type of billing document, after a predetermined amount of time, after some predetermined event, or any appropriate trigger.

In some embodiments, the method 300 may be configured so the computing system 100 receives from the system server, industry average prices for products based on billing documents received from other users. For example, when multiple users request price quotes for a product from a specific vendor, the system servers may store and compare the quoted prices and determine an average industry price. In some embodiments, the system servers may store the industry average price in the structured data object.

At 312, the method 300 may generate a visualization based on the inconsistencies that were identified. In some embodiments, the visualization may be integrated into the display of the structured data object, the visualization may also be a standalone visual element. For example, specific cells related to a logical inconsistency may be colored differently to indicate the inconsistency. In some embodiments, different colors may indicate a varying level of inconsistency where a large inconsistency is bright red and a small inconsistency is light yellow. Those of ordinary skill in the art would appreciate that any color scheme or type of visualization may be utilized. Forms of visualization include, but are not limited to: scatter plots, line graphs, pie charts, bar charts, heat maps, area charts, choropleth maps, and histograms.

At 314, the method 300 renders a user interface for display which includes a representation of the structured data object. In some embodiment the computing device renders to a display such as a: screen (e.g., liquid crystal display (LCD), light-emitting diode (LED), backlit LCD, thin-film transistor (TFT) LCD, quantum dot (QLED), display Light-emitting diode (LED) display, organic LED (OLED), AMOLED, Super AMOLED, etc.), a projector, a wearable headset, or any suitable display.

Figure 4:
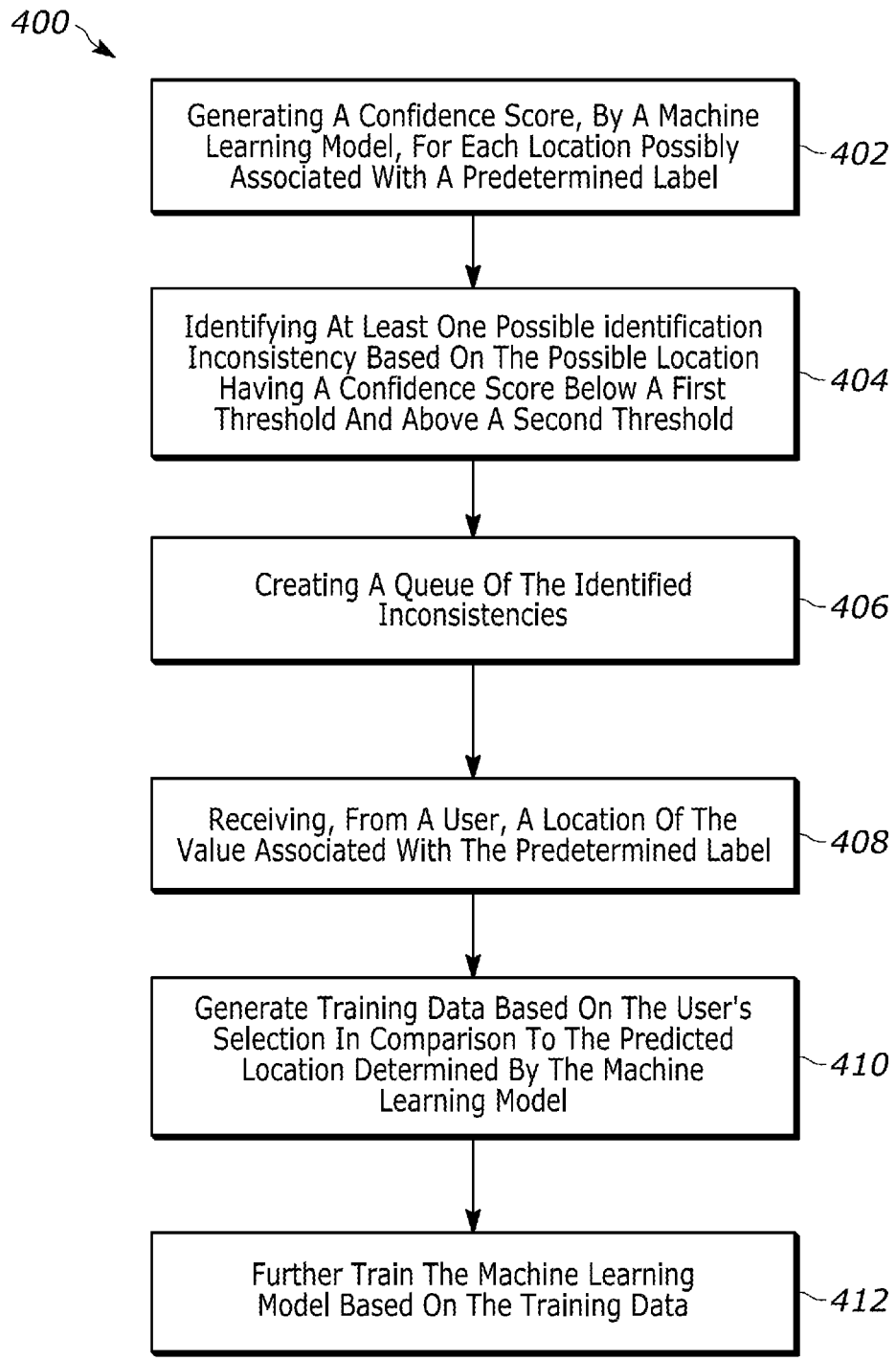
FIG. 4 generally illustrates a flow diagram of a method for increasing the accuracy of a machine learning model according to the principles of this present disclosure.

FIG. 4 generally illustrates a document inconsistency identification method 400 for increasing the accuracy of the machine learning model 206 in accordance with one or more aspects of the present disclosure. The method 400 may access billing documents from inbox 208. At 402, the method 400 generates, using the machine learning model 206, a confidence score for each portion of a billing document that may be associated with a predetermined label. For each predetermined label associated with a billing document, the machine learning model 206 utilizes logic developed based on labeled training data of billing documents. In some embodiments, the billing document is scanned and content of the billing document may indicate the inclusion of one or more predetermined labels. The machine learning model 206 may rank each location based on the confidence score and select the most likely candidate location based on the confidence score. For example, a machine learning model 206 may be trained to locate the "amount due" value associated with a predetermined label when the billing document content include the term "amount due" or some synonym thereof. The machine learning model 206 may take into consideration previously identified positions associated with the label, spatial relationships with other elements, and the original sender of the billing document.

At 404, the method 400 identifies one or more identification inconsistencies based on the highest scoring location having a confidence score above a first threshold and below a second threshold. In some embodiments, when both threshold are satisfied than no identification inconsistency is identified. In some embodiments, when neither threshold are satisfied an error is generated.

At 406, the method 400 adds the identification inconsistency to a queue. In some embodiments, the queue of identification inconsistencies await input from the user to resolve the inconsistency. The user may engage the queue at the time of their choosing and may be presented with the billing document and predetermined label related to the identification inconsistency. At 408, the method 400receives from the user an input indicating a location on the billing document. The location selected by the user may indicate the position of a value related to the predetermined label.

At 410, the method 400 generates training data based on the user's selection, the billing document, the predetermined label, the sender of the billing document, and the location with the highest confidence score. At 412, the method 400 further trains the machine learning model 206 based on the newly generated training data. In some embodiments, the increased training leads to a more efficient machine learning model. In some embodiments, the use of the method 400 is an iterative process where new training data is generated and used to further train the machine learning model 206. The more training data used to train the machine learning model 206, the more accurate its confidence score calculations become.

Figure 5:
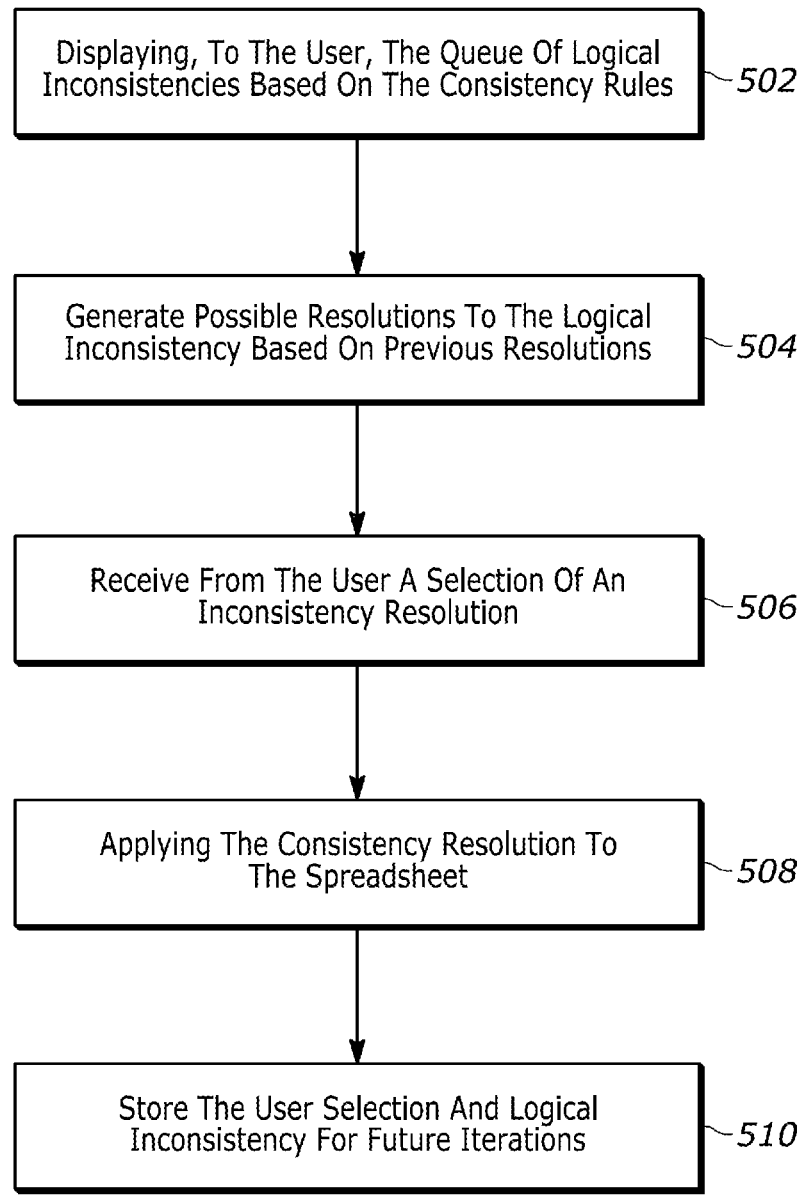
FIG. 5 generally illustrates a flow diagram of a method for accepting user input to more accurately identify logical inconsistencies according to the principles of this present disclosure.

FIG. 5 generally illustrates accuracy improvement for a logical inconsistency identification method 500 based on accepting user input to more accurately identify logical inconsistencies in accordance with one or more aspects of the present disclosure. At 502, the method 500 displays to the user a queue of logical inconsistencies. In some embodiments the logical inconsistencies are determined based on a consistency logic 214. In some embodiments, the identification of a logical inconsistency is indicative of a billing error or an error in the OCR process. The user may review the queue of logical inconsistencies on the computing device and view supporting information related to the logical inconsistencies. In some embodiments, supporting information may include the associated billing document, the associated data from the structured data object and any other relevant data.

At 504, the method 500 may generate a possible resolution to the logical inconsistency based on resolutions of similar previous logical inconsistencies. For example, a logical inconsistency may be identified relating to a string being stored for a predetermined label where a number is expected. The user may indicate this is an identification error, possibly related to the OCR process. In future iterations the user may be faced with a similar inconsistency based on a predetermined label being associated with a string when a value is expected. Based on previous user input, the method 500 will also generate and display a possible resolution. In the example above, the user will also be provided a suggested resolution indicating the current inconsistency is also related to an error in the OCR process.

In another example, the logical inconsistency may be related to a value of a first predetermined label related to products ordered should be equal to the value of a second predetermined label related to products received. When the user is presented with the inconsistency they may determine that the vendor did not ship the correct quantity of product. The user may then generate an email to the vendor in order to alert them of the inconsistency. The method 500 retains the logical inconsistency data, the actions of the user, and the content of the message to use as training data. Future iterations will make available an email generation option as a resolution for similar logical inconsistencies.

At 506, the method 500 may receive a selection of a resolution for the logical inconsistency. For example, the logical inconsistency may be related to a missing value and the resolution of the user is to provide the correct the value. At 508, the method 500 may apply the change to the structured data object if appropriate. In some embodiments the method 500 may perform whatever action the user indicates is necessary for the logical inconsistency to be resolved. This may include, altering a value, creating a logical consistency rule for the machine learning model 206, creating a consistency logic rule, or any appropriate action.

At 510, the method 500 stores the logical inconsistency, the predetermined label associated with the logical inconsistency, and the resolution action of the user for future iterations.

Figure 6:
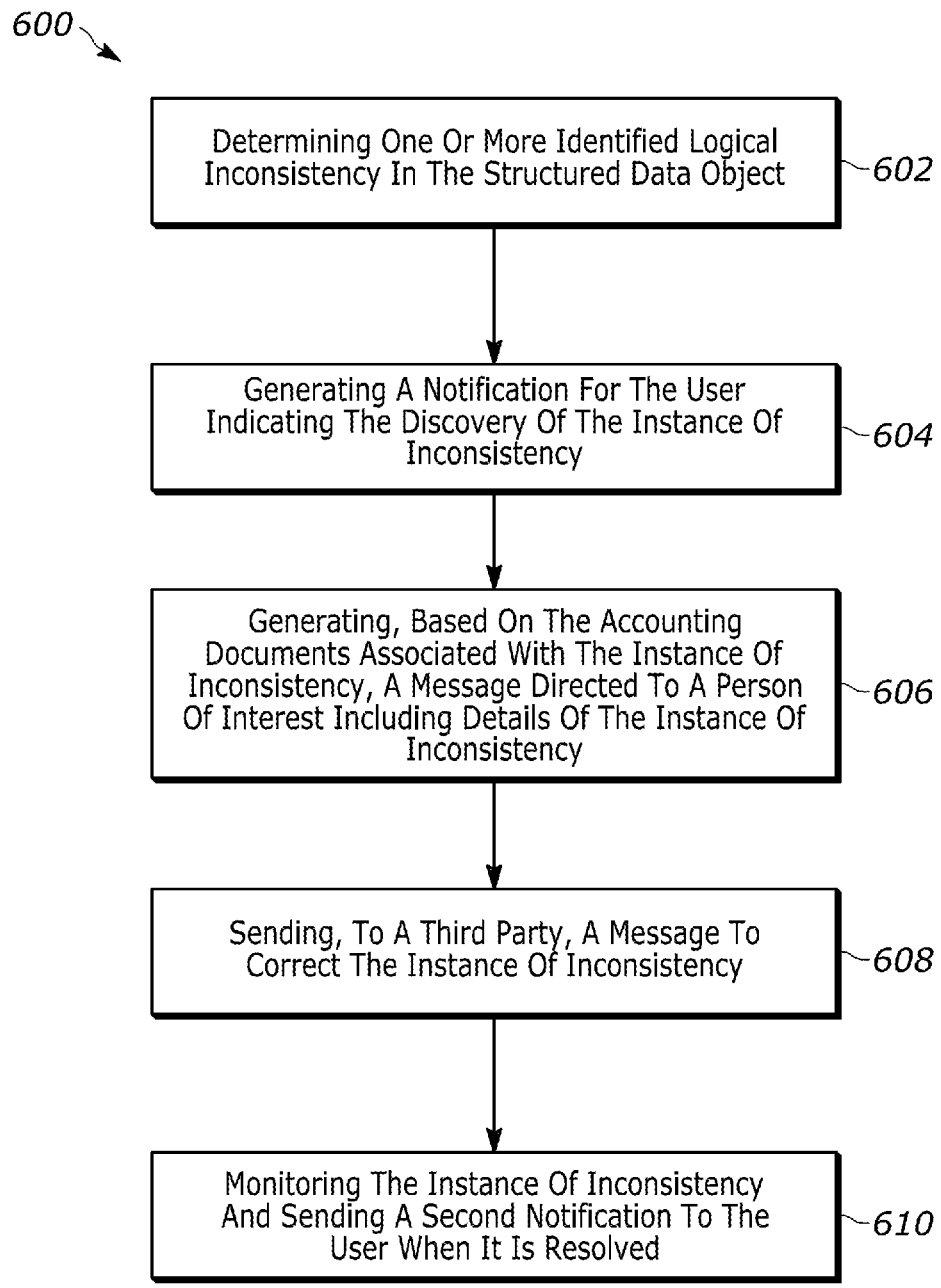
FIG. 6 generally illustrates a flow diagram of a method for automatically generating a course of action to address an identified inconsistency according to the principles of this present disclosure.

FIG. 6 generally illustrates an automatic course of action generation method 600 to address an identified inconsistency in accordance with one or more aspects of the present disclosure. At 602, the method 600 may parse the structured data object in order to identify logical inconsistencies in the structured data object. In some embodiments the structured data object may be parsed and, based on predetermined logical consistency rules, inconsistencies may be identified. In some embodiments logical consistency rules may be generated by the user, may be created by the developer, or may be modified based on an existing logical consistency rule. A logical consistency rule may be a logical check on a specific value by comparing it to one or more related values. For example, a logical consistency rule may check that the quoted price of a product matches the price charged. Another example includes, a logical consistency rule which may check that the number of products ordered match the number or products received. Some logical consistency rules may be triggered by receiving a specific type of billing document, after a predetermined amount of time, after some predetermined event, or any appropriate trigger.

At 604, method 600 generates a notification for the user indicating the discovery of a logical inconsistency. The notification may include information related to the logical inconsistency including the related predetermined label, the value associated with the label, the logical consistency rule, and any other relevant information. In some embodiments the notification may be any of, but not limited to, an app push notification, a web push notification, browser push notification, an inbox push notification, in-app notification, an audible notification, a haptic notification, a visual notification, or some combination thereof. The notification may be not be sent immediately but is instead sent after a predetermined amount of time. Such a notification may await other alerts and cluster them into a single notification.

In some embodiments, the logical inconsistency being monitored is generated by the user. For example, the user may set up a notification email be sent when an instance of receiving an invoice without a price quote is detected. The user may further require that the notification be sent as an email and include all relevant information related to the detected instance. The email generated automatically for the user may read: "On Invoice Number "XXX" on Job Number "YYY" part number "ZZZ" was invoiced for $30.02 with a quantity of 264 totaling $7,925.28 by vendor "Building Supplies LLC" with no quoted amount found." These alerts may be set up via MICROSOFT AZURE LOGIC APPS or any similar solution.

At 606, the method 600 may generate a message to a person of interest related to the logical inconsistency. When the method 600 generates a possible resolution to the logical inconsistency based on resolutions of similar previous logical inconsistencies a message may also be generated. For example, the logical inconsistency may be related to a value of a first predetermined label related to products ordered should be equal to the value of a second predetermined label related to products received. When the user is presented with the inconsistency they may determine that the vendor did not ship the correct quantity of product. The user may then generate an email to the vendor in order to alert them of the inconsistency. The method 600 retains the logical inconsistency data, the actions of the user, and the content of the message to use as training data.

In some embodiments, the method 600, when the user encounters a similar inconsistency, use the message generated by the user in order to generate a new message. The method 600 may remove information related to the previous logical inconsistency and replace them with information related to the current logical inconsistency. In some embodiments, the message may also be generated based on one or more predetermined templates. The templates may be related to specific logical inconsistencies.

At 608, the method 600 transmits the message to the person of interest. In some embodiments, the message is sent automatically or after confirmation by the user. The user may be given an opportunity to edit the message before they confirm it is ready to be sent.

At 610, the method 600 may monitor the inconsistency and await a change in the structured data object in order to determine whether or not the inconsistency has been resolved. For example, when the message indicated to the person of interest that the cost quoted for a product did not equal the amount charged, the computing system 100 may monitor the value related to amount charged in the structured data object. When the vendor sends an updated billing document correcting the error, the change in the structured data object will resolve the inconsistency.

In some embodiments, the method 600 may be configured so that a user may set up a report to be compiled and sent at predetermined intervals. For example, the user may indicate receiving of a specific billing document from different vendors be tracked. The method 600 may monitor inbox 208 in line with the request from the user and compile a report of the specific billing documents received over a predetermined period. In some embodiments, when the predetermined period ends, the report is sent to the user and whomever else the user chose to include in the receiving of the report.

Figure 7:
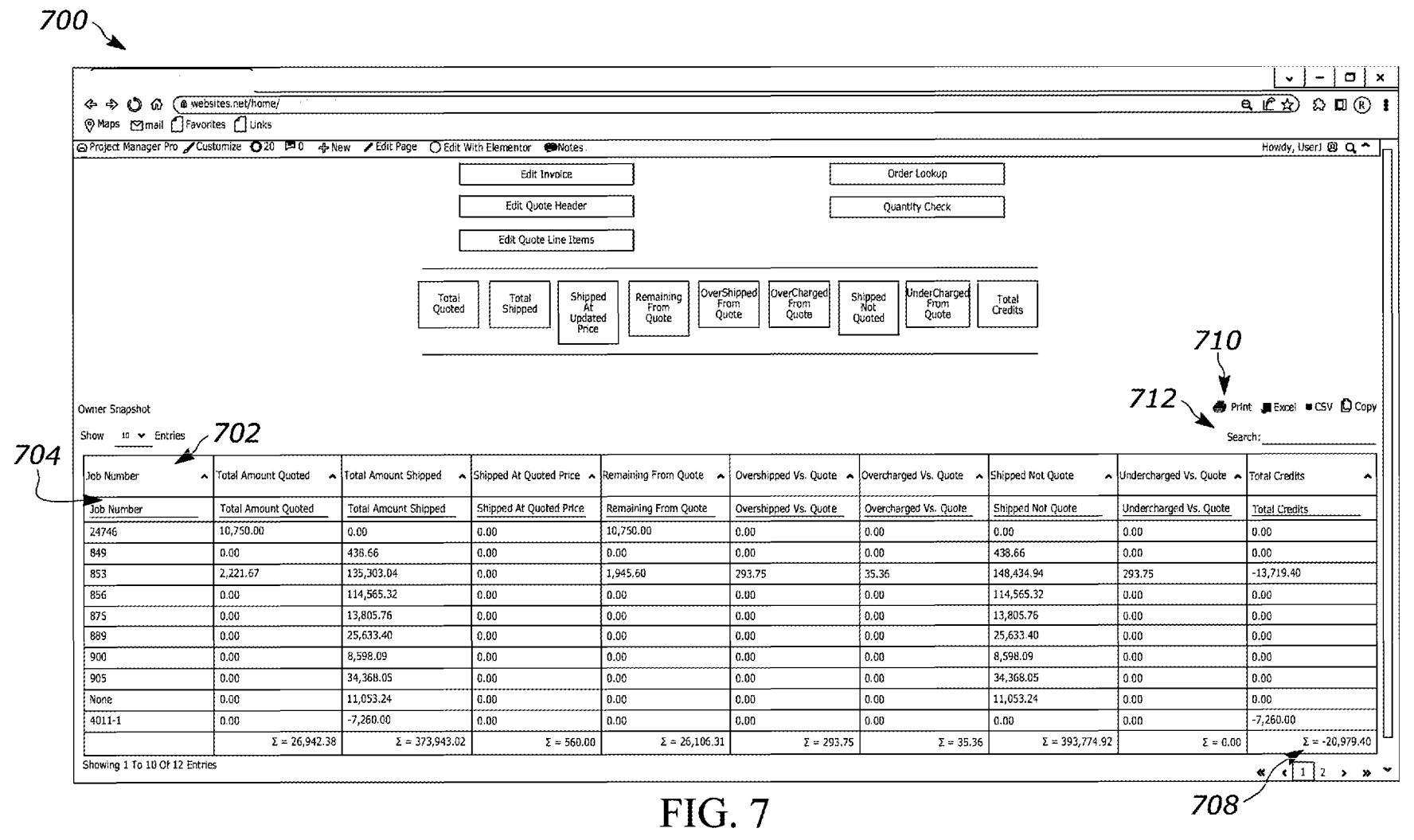

FIG. 7 generally illustrates interface 700 for an owner snapshot in accordance with one or more aspects of the present disclosure. The interface 700 may be generated by the computing system 100 and rendered on to a display. Interface 700 may include user interface (UI) element 702 which provides a header for the column of the spreadsheet indicating the job number of each entry. Interaction with the UI element 702 allows the user to filter and/or sort the entries based on the job number of the entries. Interface element 704 may be text entry field where entering digits may result in a filtering of job number entries based on the digits entered. For example, when the number 26 are entered, all job number entries that contain the digits of the number 26 will be displayed with all non-matching entries removed.

In some embodiments, the interface 700 may include UI interface element 708 which indicates the sum of its corresponding column. The value is automatically populated based on the entries populating the spreadsheet. In some embodiments, as filters are applied, the value of interface element 708 automatically updates to reflect the new sum. In some embodiments the interface 700 may include interface element 712 which may include a text entry field. Text inputs into the interface element 712 may include numbers and/or letters. The interface 700, in response to detecting user input, displays search results based on the user's input.

In some embodiments, the interface 700 may include interface element 710 which allows the user to output the spreadsheet and/or a selection of the spreadsheet. The data may be output as a file in any suitable format such as: EXCEL (.XLS, .XLSX, .XLSM), comma separated values (.CSV), tab separated values (.TSV), open document format (.ODS), text (.TXT, .CSV), table (.DAT), JSON, or any suitable file format.

In some embodiments, the systems and methods described herein may be configured so that UI element 702, of interface 700, is a visual representation of the structured data object. The fields selected for view are selected by default, a user may alter the fields to their liking. In some embodiments, the fields include but are not limited to: invoice ID, line item ID, client number, client, vendor, invoice number, position, invoice date, job number, PO Number, article number, description, quoted unit price, invoiced unit price, price difference, unit of measurement, invoiced quantity, extended price. In some embodiments, the UI element 708 includes search bars and filters for each column of the structured data object. In some embodiments the search bar allows the user to enter a value and display all rows that have a matching value in the column where the search was initiated. In some embodiments the user may filter the order in which the rows of data are displayed. Criteria upon which a user may filter the structured data object include: highest value, lowest value, by color, alphabetically ascending, alphabetically descending, priority, and any other suitable attribute of which the structured data object may be filtered.

FIG. 8 generally illustrates interface 800 for a data entry editing view in accordance with one or more aspects of the present disclosure. The interface 800 may be generated by the computing system 100 and rendered on to a display. Interface 800 may include user interface (UI) element 802 which, in contrast to interface 700, displays invoice numbers associated with entries in the spreadsheet. Interaction with the UI element 802 allows the user to filter and/or sort the entries based on the invoice number of the entries. Interface element 802 may include a text entry field where entering digits may result in a filtering of invoice number entries based on the digits entered. For example, when the number 26 are entered, all invoice number entries that contain the digits of the number 26 will be displayed with all non-matching entries removed.

In some embodiments the interface 800 may include user interface element 804 which displays the PO number associated with each spreadsheet entry. In interface 800 the user may edit the PO number entries directly and those changes will be automatically applied across all instances of the spreadsheet.

In some embodiments, the systems and methods described herein may be configured so that interface 800 includes a visual representation of the structured data object. The fields selected for view are selected by default, a user may alter the fields to their liking. In some embodiments those fields include but are not limited to: vendor, job name, part number, quote quantity, invoice quantity, quantity remaining, quote price, and dollars remaining. In some embodiments, the UI element 808 includes search bars and filters for each column of the structured data object. In some embodiments the search bar allows the user to enter a value and display all rows that have a matching value in the column where the search was initiated. In some embodiments the user may filter the order in which the rows of data are displayed. Criteria upon which a user may filter the structured data object include: highest value, lowest value, by color, alphabetically ascending, alphabetically descending, priority, and any other suitable attribute of which the structured data object may be filtered.

Figure 9:
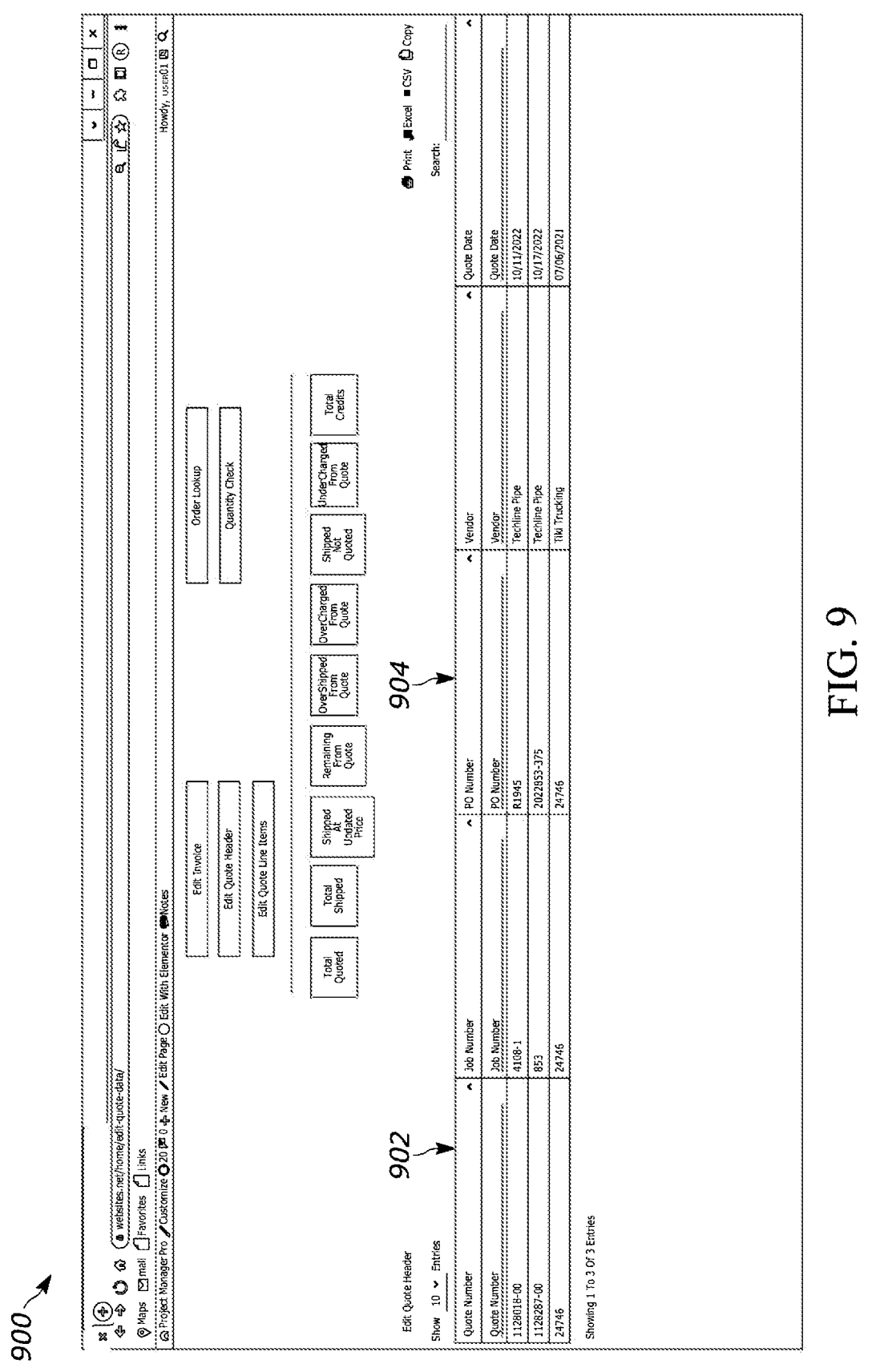

FIG. 9 generally illustrates interface 900 for a quote header view in accordance with one or more aspects of the present disclosure. The interface 900 may be generated by the computing system 100 and rendered on to a display. Interface 900 may include user interface (UI) element 902 which displays quote numbers associated with entries in the spreadsheet. Interaction with the UI element 902 allows the user to filter and/or sort the entries based on the quote number of the entries. UI interface element 902 may include a text entry field where entering digits may result in a filtering of quote number entries based on the digits entered. For example, when the number 26 are entered, all quote number entries that contain the digits of the number 26 will be displayed with all non-matching entries removed.

In some embodiments, the interface 900 may further include interface element 904 which displays the PO number associated with each spreadsheet entry. In interface 900 the user may edit the PO number entries directly and those changes will be automatically applied across all instances of the spreadsheet.

FIG. 10 generally illustrates interface 1000 for a quote line item view in accordance with one or more aspects of the present disclosure. The interface 1000 may be generated by the computing system 100 and rendered on to a display. Interface 1000 may include user interface (UI) element 1002 which displays a header for the description column of each entry in the spreadsheet. The interface 1000 may further include user interface element 1004 which displays a header of the extended price column. Additionally or alternatively, interface 1000 allows a user to edit specific line items pertaining to a quote such as unit price, as well as quantities not available for display in other interfaces. In some embodiments, the edits are applied to all instances of the spreadsheet.

Figure 11:
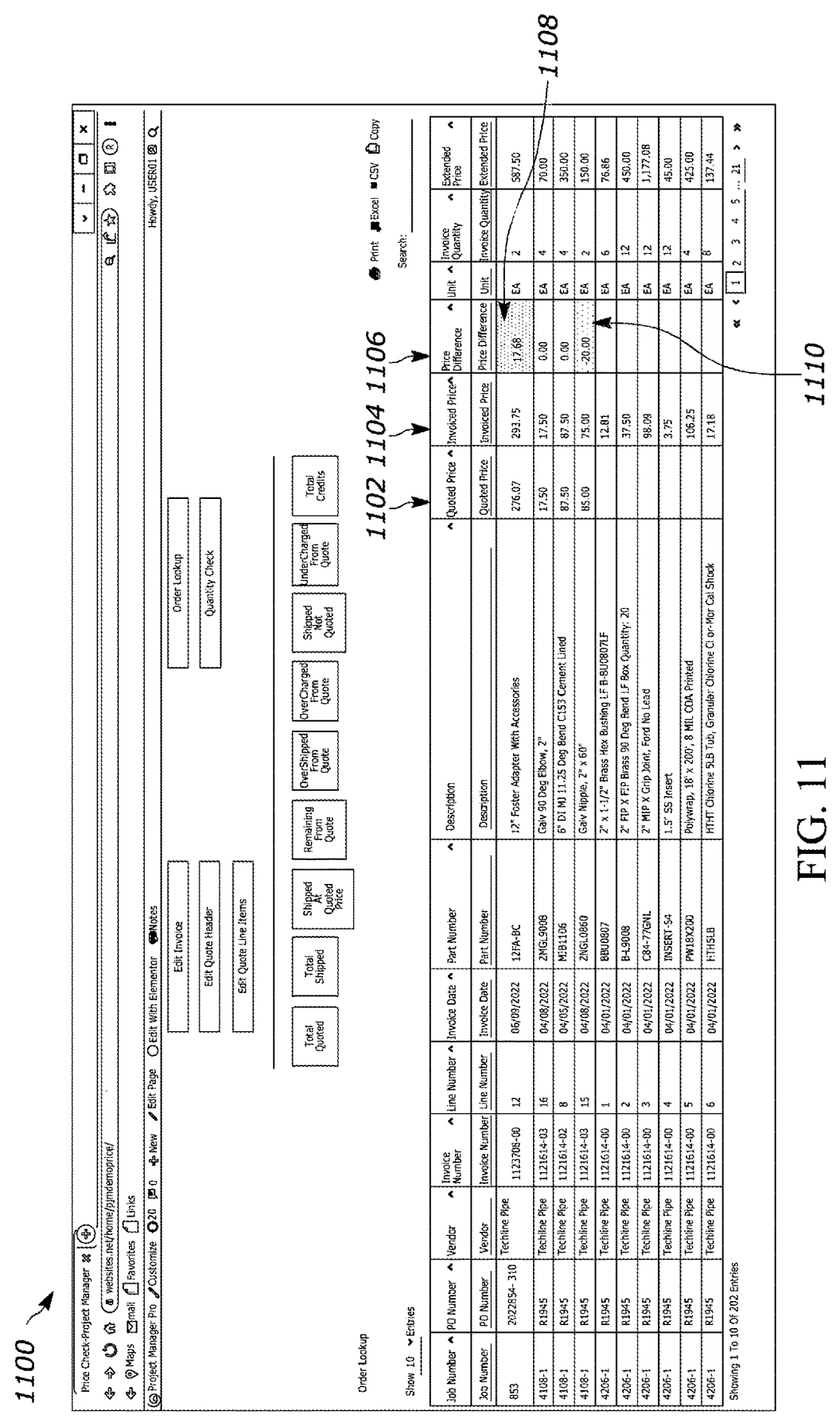

FIG. 11 generally illustrates interface 1100 for an order look up view in accordance with one or more aspects of the present disclosure. The interface 1100 may be generated by the computing system 100 and rendered on to a display.

Interface 1100 may include user interface (UI) element 1102 which displays the quoted price heading for the appropriate column of the spreadsheet. Interface 1100 may include user interface (UI) element 1104 which displays the invoiced price heading for the appropriate column of the spreadsheet. Interface 1100 may include user interface (UI) element 1106 which displays the price difference heading where the price difference is calculated based on a comparison between the quoted price and the invoiced price.

In some embodiments, the cell of the price difference column may provide a visual indicator of the status of the price difference. For example, the interface element 1108 is associated with a quoted price that is less than the invoice price. Interface element 1108 contains the value 17.68 indicating that the price paid was above the amount originally quoted. Interface element 1108 will automatically generate a visual indicator which indicates the price difference is undesirable, such as shading or coloring the interface element 1108. In contrast, visual element 1110 is associated with a quoted price that is greater than the invoiced price. In response to the value associated with interface element 1110 being −20, the element will automatically generate a visual indicator different from the above described visual indicator. In some embodiments, a visual indicator may include, but is not limited to, a color, a texture, a pattern, a symbol, an icon, an image, a video, or any other appropriate indicator.

Figure 12:
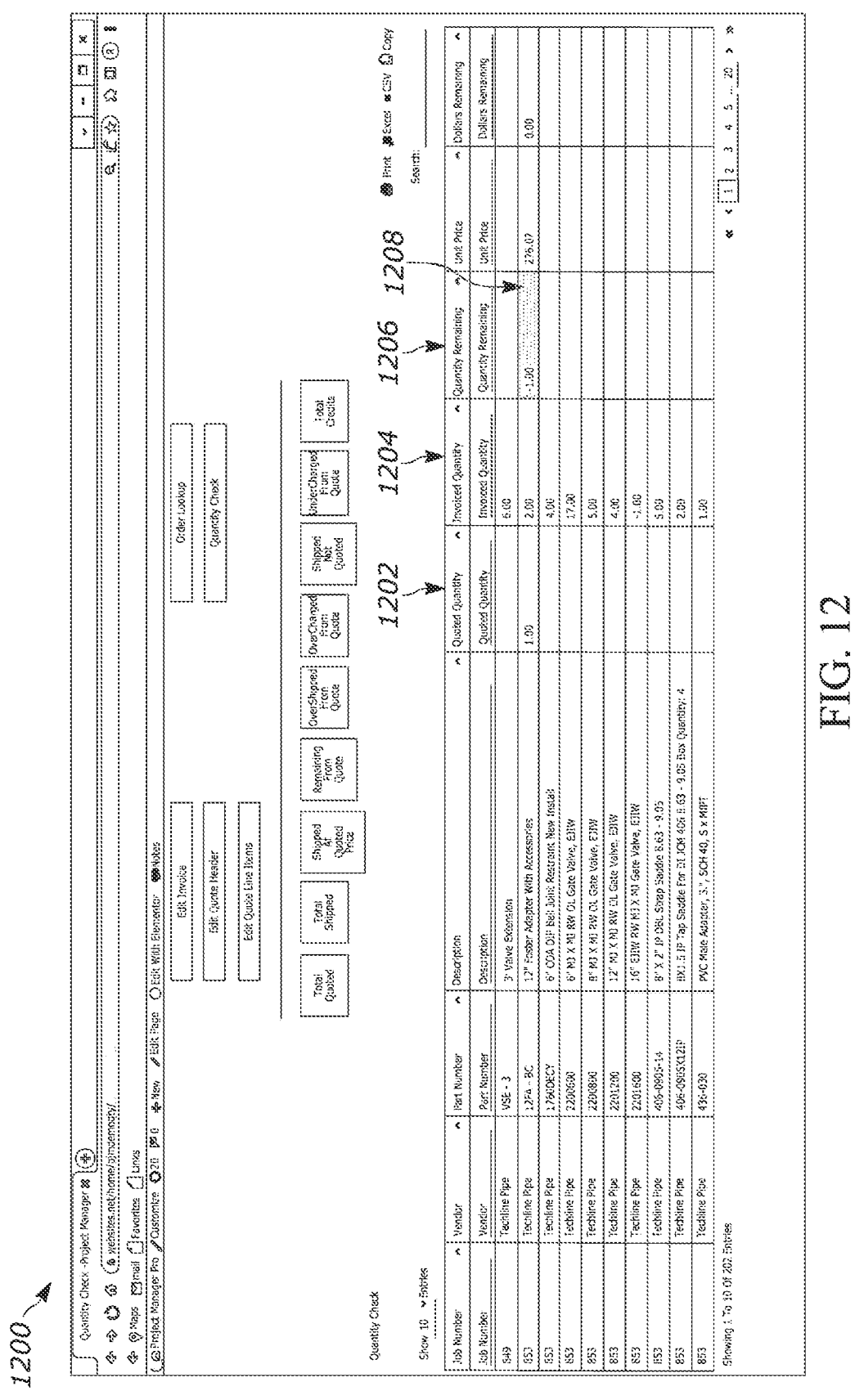

FIG. 12 generally illustrates interface 1200 for a quantity check view in accordance with one or more aspects of the present disclosure. The interface 1200 may be generated by the computing system 100 and rendered on to a display. Interface 1200 may include user interface (UI) element 1202 which displays a header for the quantity quoted column of each entry in the spreadsheet. Interface 1200 may include user interface (UI) element 1204 which displays a header for the invoiced quantity column of each entry in the spreadsheet. Interface 1200 may include user interface (UI) element 1206 which displays a header for the quantity remaining column of each entry in the spreadsheet. Interface 1200 may include user interface (UI) element 1206 which displays the quantity remaining heading where a difference is calculated based on a comparison between the quoted quantity and the invoiced quantity.

In some embodiments, the cell of the difference column may provide a visual indicator of the status of the price difference. For example, the interface element 1208 is associated with a quoted price that is less than the invoice price. Interface element 1208 contains the value −1.00 indicating that the amount of product delivered was above the quantity originally quoted. Interface element 1108 will automatically generate a visual indicator which indicates the price difference is undesirable, such as shading or coloring the interface element 1208. In some embodiments, a visual indicator may include, but is not limited to, a color, a texture, a pattern, a symbol, an icon, an image, a video, or any other appropriate indicator.

Figure 13:
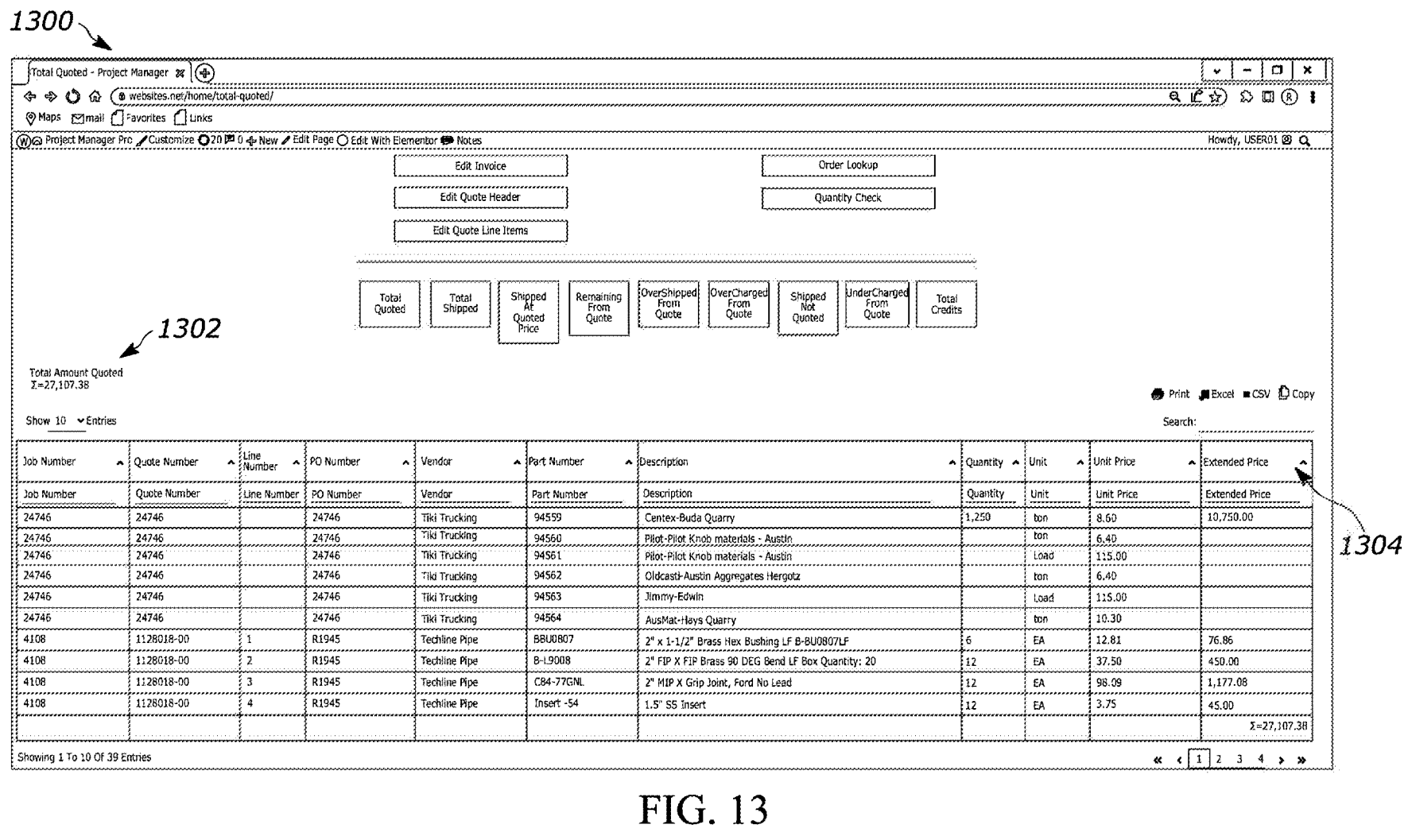

FIG. 13 generally illustrates interface 1300 for a total cost quoted view in accordance with one or more aspects of the present disclosure. The interface 1300 may be generated by the computing system 100 and rendered on to a display. Interface 1300 may include user interface (UI) element 1302 which indicates an automatically generated value of the total amount of money quoted for a particular project. The interface 1300 may also include interface element 1304 which displays a header for the extended price column, the sum of which is displayed by UI element 1302.

Figure 14:
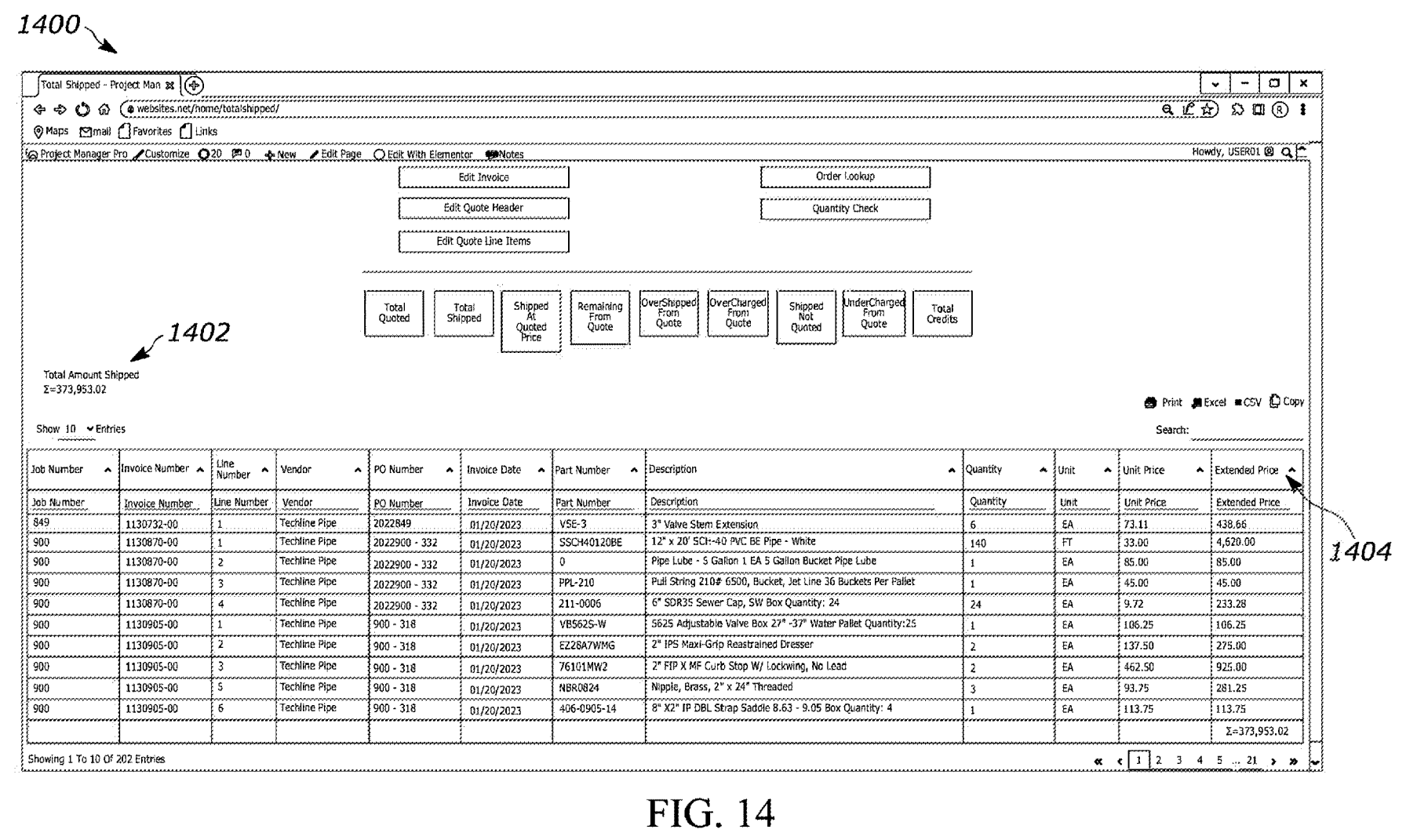

FIG. 14 generally illustrates interface 1400 for a total amount shipped view in accordance with one or more aspects of the present disclosure. The interface 1400 may be generated by the computing system 100 and rendered on to a display. Interface 1400 may include user interface (UI) element 1402 which indicates an automatically generated value of the total amount of money for the products that were shipped for a particular project. The interface 1400 may also include interface element 1404 which displays a header for the extended price column, the sum of which is displayed by UI element 1402. In some embodiments, the spreadsheet includes data for all materials invoice to a project regardless of where it was quoted or invoiced correctly.

FIG. 15 generally illustrates interface 1500 for a view of products shipped at quoted price in accordance with one or more aspects of the present disclosure. The interface 1500 may be generated by the computing system 100 and rendered on to a display. Interface 1500 may include user interface (UI) element 1502 which indicates an automatically generated value of the total amount of money for the products that were invoiced at the quoted price for a particular project. The interface 1500 may also include interface element 1504 which displays a header for the total amount shipped column, the sum of which is displayed by UI element 1502.

FIG. 16 generally illustrates interface 1600 for a remaining material from quote view in accordance with one or more aspects of the present disclosure. The interface 1600 may be generated by the computing system 100 and rendered on to a display. Interface 1600 may include user interface (UI) element 1602 which indicates an automatically generated value of the total amount of product remaining which has been quoted but not yet invoiced for a particular project. The interface 1600 may also include interface element 1604 which displays a header for the dollars remaining column, the sum of which is displayed by UI element 1602.

Figure 17:
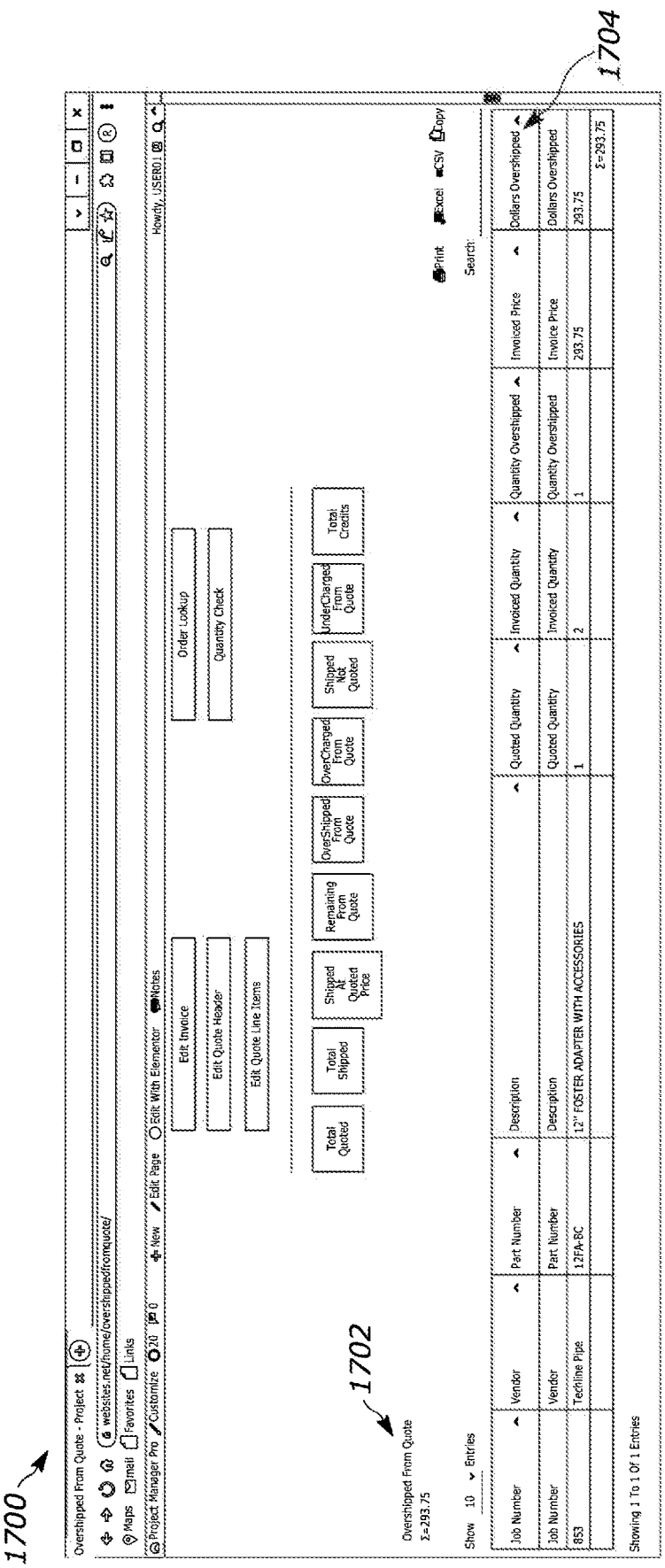
FIG. 17 generally illustrates interface for an overshipped from quote view in accordance with one or more aspects of the present disclosure.

FIG. 17 generally illustrates interface 1700 for an overshipped from quote view in accordance with one or more aspects of the present disclosure. The interface 1700 may be generated by the computing system 100 and rendered on to a display. Interface 1700 may include user interface (UI) element 1702 which indicates an automatically generated value of the total amount of money for the products that were shipped in a quantity greater than the quantity quoted for a particular project. The interface 1700 may also include interface element 1704 which displays a header for the dollars overshipped column, the sum of which is displayed by UI element 1702.

Figure 18:
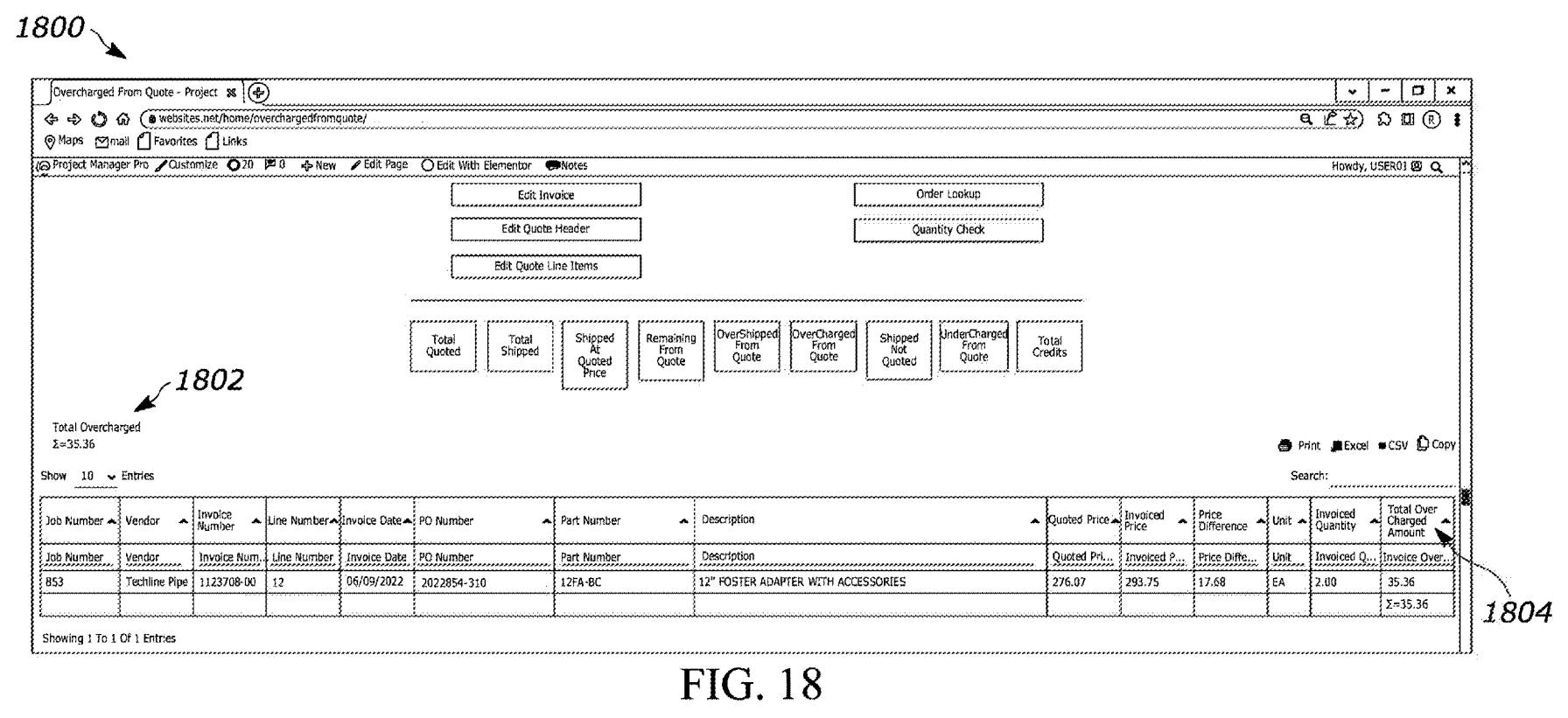

FIG. 18 generally illustrates interface 1800 for an overcharged from quote view in accordance with one or more aspects of the present disclosure. The interface 1800 may be generated by the computing system 100 and rendered on to a display. Interface 1800 may include user interface (UI) element 1802 which indicates an automatically generated value of the total amount of money for products that were shipped in excess of the amount quoted for a particular project. The interface 1800 may also include interface element 1804 which displays a header for the total overcharged amount column, the sum of which is displayed by UI element 1802.

Figure 19:
FIG. 19 generally illustrates interface for a shipped and not quoted view in accordance with one or more aspects of the present disclosure.

FIG. 19 generally illustrates interface 1900 for a shipped and not quoted view in accordance with one or more aspects of the present disclosure. The interface 1900 may be generated by the computing system 100 and rendered on to a display. Interface 1900 may include user interface (UI) element 1902 which indicates an automatically generated value of the total amount of money for the products that were shipped but not quoted on a particular project. The interface 1900 may also include interface element 1904 which displays a header for the extended price column, the sum of which is displayed by UI element 1902.

Figure 20:
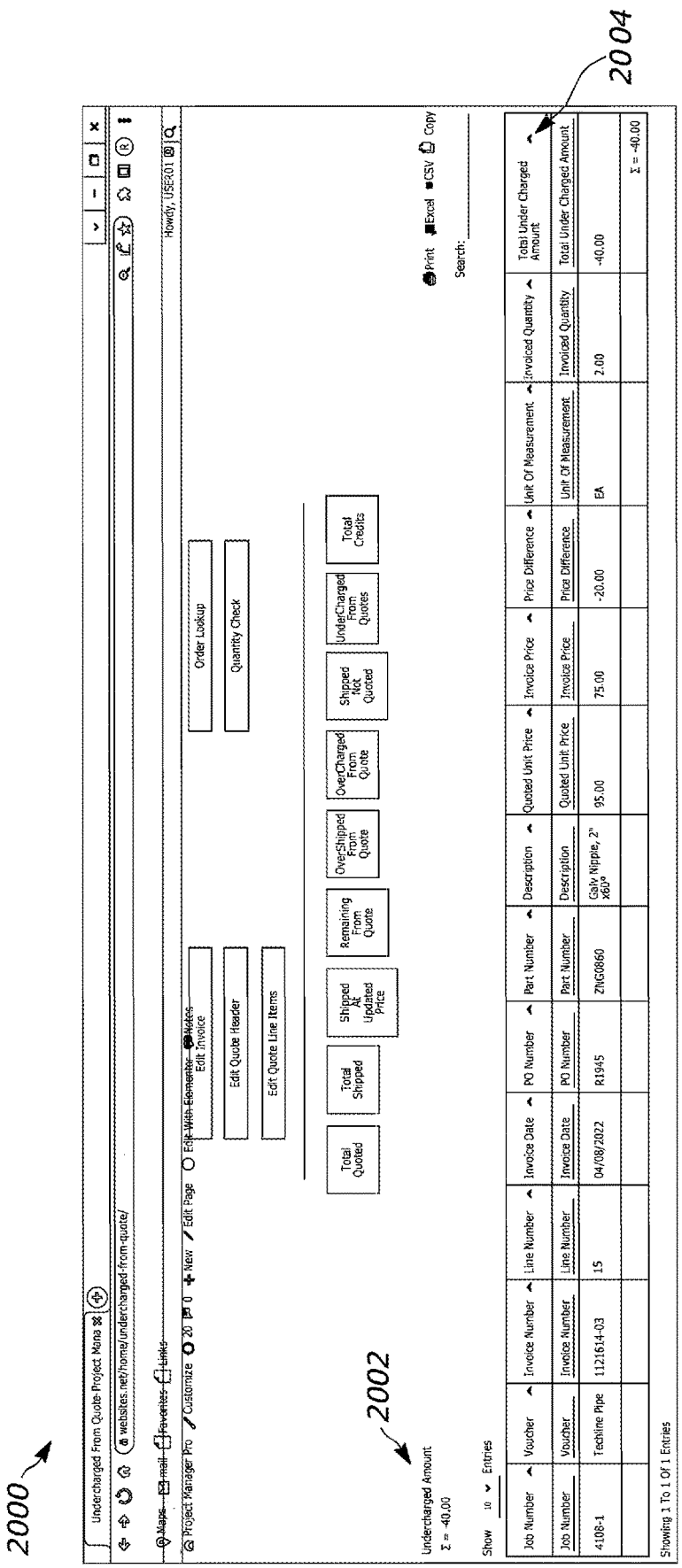
FIG. 20 generally illustrates interface for an under charged from quote view in accordance with one or more aspects of the present disclosure.

FIG. 20 generally illustrates interface 2000 for an undercharged from quote view in accordance with one or more aspects of the present disclosure. The interface 2000 may be generated by the computing system 100 and rendered on to a display. Interface 2000 may include user interface (UI) element 2002 which indicates an automatically generated value of the total amount undercharged for a product in view of the quoted price for a particular project. The interface 2000 may also include interface element 2004 which displays a header for the total undercharged amount column, the sum of which is displayed by UI element 2002.

FIG. 21 generally illustrates interface 2100 for a total credits view in accordance with one or more aspects of the present disclosure. The interface 2100 may be generated by the computing system 100 and rendered on to a display. Interface 2100 may include user interface (UI) element 2102 which indicates an automatically generated value of the total amount of credit received for a returned product for a particular project. The interface 2100 may also include interface element 2104 which displays a header for the total undercharged amount column, the sum of which is displayed by UI element 2102.

Clauses

Clause 1. A method for using a machine learning model to identify a logical inconsistency, comprising:
  receiving, via a network, a document related to a user;
  receiving, from the machine learning model, a predetermined label and a value associated with the predetermined label wherein the value is associated with a location on the document;
  storing the predetermined label and the value associated with the predetermined label in a structured data object;
  identifying, based a consistency rule, a logical inconsistency in the structured data object;
  generating a visualization based on the logical inconsistency and
  providing, at a display device, the structured data object, wherein the structured data object includes the visualization of the logical inconsistency.

Clause 2. The method of any clause herein, further comprising:
  storing an identification inconsistency, where the identification inconsistency is identified when a confidence score generated by the machine learning model for a prestored location of a value associated a predetermined label in the structured data object is less than a first predetermined threshold and greater than a second predetermined threshold; and
  receiving, from the user, a selection of the location of the value associated with the predetermined label for the machine learning model and storing the value associated with the predetermined label.

Clause 3. The method of any clause herein, further comprising:
  generating one or more training datasets based on the document related to the user, the predetermined label, the prestored location of the value associated with the predetermined label, and the user selection of the location of the value associated with the predetermined label; and training the machine learning model, based on the one or more training datasets, to more accurately identify the location of the value associated with predetermined label.

Clause 4. The method of any clause herein, further comprising:
generating a consistency rule when the user interacts with the visualization and selects a consistency resolution option; and
storing the consistency rule and resolving a future inconsistency based on the consistency rule.

Clause 5. The method of any clause herein, wherein the document is one of: a price quote document, an invoice document, and a delivery confirmation document.

Clause 6. The method of any clause herein, wherein the consistency rule may include: comparing a quantity ordered with a quantity delivered, comparing a quoted price per unit to an invoiced price per unit, and comparing an invoiced price per unit to an industry average price per unit.

Clause 7. The method of any clause herein, further comprising:
generating, based on monitoring of the structured data object content, a report about changes to the structured data object content over a predetermined interval; and
sending, to a remote computing device, the report.

Clause 8. The method of any clause herein, wherein storing the value in the structured data object further includes: generating a first unique identification value for the document and a second unique identification value for the value.

Clause 9. The method of any clause herein, further comprising:
sending, in response to identifying a logical inconsistency, a message to a remote computing device based in part on the logical inconsistency and the consistency rule associated with the logical inconsistency.

Clause 10. A system for using a machine learning model to identify a logical inconsistency, comprising:
a memory device storing instructions; and
a processing device communicatively coupled to the memory device, wherein the processing device executes the instructions to:
receive, via a network, a document related to a user;
receive, from the machine learning model, a predetermined label and a value associated with the predetermined label wherein the value is associated with a location on the document;
store the predetermined label and the value associated with the predetermined label in a structured data object;
identify, based a consistency rule, a logical inconsistency in the structured data object;
generate a visualization based on the logical inconsistency and
provide, at a display device, the structured data object, wherein the structured data object includes the visualization of the logical inconsistency.

Clause 11. The system of any clause herein, further comprising:
storing an identification inconsistency, where the identification inconsistency is identified when a confidence score generated by the machine learning model for a prestored location of a value associated a predetermined label in the structured data object is less than a first predetermined threshold and greater than a second predetermined threshold; and
receiving, from the user, a selection of the location of the value associated with the predetermined label for the machine learning model and storing the value associated with the predetermined label Clause 12. The system of any clause herein, further comprising:
generating one or more training datasets based on the document related to the user, the predetermined label, the prestored location of the value associated with the predetermined label, and the user selection of the location of the value associated with the predetermined label; and
training the machine learning model, based on the one or more training datasets, to more accurately identify the location of the value associated with predetermined label.

Clause 13. The system of any clause herein, further comprising:
generating a consistency rule when the user interacts with the visualization and selects a consistency resolution option; and
storing the consistency rule and resolving a future inconsistency based on the consistency rule.

Clause 14. The system of any clause herein, further comprising:
sending, in response to identifying a logical inconsistency, a message to a remote computing device based in part on the logical inconsistency and the consistency rule associated with the logical inconsistency.

Clause 15. A tangible, non-transitory computer-readable medium storing instructions that, when executed, cause a processing device to:
receive, via a network, a document related to a user;
receiving, from the machine learning model, a predetermined label and a value associated with the predetermined label wherein the value is associated with a location on the document;
store the predetermined label and the value associated with the predetermined label in a structured data object;
identify, based a consistency rule, a logical inconsistency in the structured data object;
generate a visualization based on the logical inconsistency and
provide, at a display device, the structured data object, wherein the structured data object includes the visualization of the logical inconsistency.

Clause 16. The computer-readable medium of any clause herein, further comprising:
storing an identification inconsistency, where the identification inconsistency is identified when a confidence score generated by the machine learning model for a prestored location of a value associated a predetermined label in the structured data object is less than a first predetermined threshold and greater than a second predetermined threshold; and
receiving, from the user, a selection of the location of the value associated with the predetermined label for the machine learning model and storing the value associated with the predetermined label.

Clause 17. The computer-readable medium of any clause herein, further comprising:
generating one or more training datasets based on the document related to the user, the predetermined label, the prestored location of the value associated with the predetermined label, and the user selection of the location of the value associated with the predetermined label; and training the machine learning model, based on the one or more training datasets, to more accurately identify the location of the value associated with predetermined label.

Clause 18. The computer-readable medium of any clause herein, further comprising:
generating a consistency rule when the user interacts with the visualization and selects a consistency resolution option; and
storing the consistency rule and resolving a future inconsistency based on the consistency rule.

Clause 19. The computer-readable medium of any clause herein, wherein the document is one of: a price quote document, an invoice document, and a delivery confirmation document.

Clause 20. The computer-readable medium of any clause herein, wherein the consistency rule may include: comparing a quantity ordered with a quantity delivered, comparing a quoted price per unit to an invoiced price per unit, and comparing an invoiced price per unit to an industry average price per unit.

Consistent with the above disclosure, the examples of assemblies enumerated in the following clauses are specifically contemplated and are intended as a non-limiting set of examples.

It is understood that the present subject matter may be embodied in many different forms and should not be construed as being limited to the embodiments set forth herein. Rather, these embodiments are provided so that this subject matter will be thorough and complete and will convey the disclosure to those skilled in the art. Indeed, the subject matter is intended to cover alternatives, modifications, and equivalents of these embodiments, which are included within the scope and spirit of the subject matter as defined by the appended claims and their equivalents. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The non-transitory computer-readable media includes all types of computer-readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using a machine learning model to identify a logical inconsistency, comprising:
receiving, via a network, a document related to a user;
receiving, from the machine learning model, a predetermined label and a value associated with the predetermined label wherein the value is associated with a location on the document, wherein: the machine learning model is initially trained using training data comprising labeled inputs, labeled outputs, and unlabeled data; the machine learning model groups the data of the unlabeled data into group clusters based on one or more patterns; and the machine learning model is subsequently trained using reinforcement learning to improve prediction accuracy of the machine learning model;
storing the predetermined label and the value associated with the predetermined label in a structured data object;
identifying, based a consistency rule, a logical inconsistency in the structured data object;
generating a visualization based on the logical inconsistency;
providing, at a display device, the structured data object, wherein the structured data object includes the visualization of the logical inconsistency;
storing an identification inconsistency, where the identification inconsistency is identified when a confidence score generated by the machine learning model for a prestored location of a value associated a predetermined label in the structured data object is less than a first predetermined threshold and greater than a second predetermined threshold; and receiving, from the user, a selection of the location of the value associated with the predetermined label for the machine learning model and storing the value associated with the predetermined label.

2. The method of claim 1, further comprising:
generating a consistency rule when the user interacts with the visualization and selects a consistency resolution option; and
storing the consistency rule and resolving a future inconsistency based on the consistency rule.

3. The method of claim 1, wherein the document is one of: a price quote document, an invoice document, and a delivery confirmation document.

4. The method of claim 1, wherein the consistency rule may include: comparing a quantity ordered with a quantity delivered, comparing a quoted price per unit to an invoiced price per unit, and comparing an invoiced price per unit to an industry average price per unit.

5. The method of claim 1, further comprising:
generating, based on monitoring of the structured data object content, a report about changes to the structured data object content over a predetermined interval; and
sending, to a remote computing device, the report.

6. The method of claim 1, wherein storing the value in the structured data object further includes: generating a first unique identification value for the document and a second unique identification value for the value.

7. The method of claim 1, further comprising:
sending, in response to identifying a logical inconsistency, a message to a remote computing device based in part on the logical inconsistency and the consistency rule associated with the logical inconsistency.

8. A system for using a machine learning model to identify a logical inconsistency, comprising:
a processor; and
a memory including instructions that, when executed by the processor, cause the processor to:
receive, via a network, a document related to a user;
receive, from the machine learning model, a predetermined label and a value associated with the predetermined label wherein the value is associated with a location on the document, wherein: the machine leaning model is initially trained using training data comprising labeled inputs, labeled outputs, and unlabeled data; the machine learning model groups the data of the unlabeled data into group clusters based on one or more patterns; and the machine learning model is subsequently trained using reinforcement learning to improve prediction accuracy of the machine learning model;
store the predetermined label and the value associated with the predetermined label in a structured data object;
identify, based a consistency rule, a logical inconsistency in the structured data object;
generate a visualization based on the logical inconsistency;
provide, at a display device, the structured data object, wherein the structured data object includes the visualization of the logical inconsistency;
store an identification inconsistency, where the identification inconsistency is identified when a confidence score generated by the machine learning model for a prestored location of a value associated a predetermined label in the structured data object is less than a first predetermined threshold and greater than a second predetermined threshold; and
receive, from the user, a selection of the location of the value associated with the predetermined label for the machine learning model and storing the value associated with the predetermined label.

9. The system of claim 8, wherein the instructions further cause the processor to:
generate a consistency rule when the user interacts with the visualization and selects a consistency resolution option; and
store the consistency rule and resolving a future inconsistency based on the consistency rule.

10. The system of claim 8, wherein the instructions further cause the processor to:
send, in response to identifying a logical inconsistency, a message to a remote computing device based in part on the logical inconsistency and the consistency rule associated with the logical inconsistency.

11. A tangible, non-transitory computer-readable medium storing instructions that, when executed, cause a processing device to:
receive, via a network, a document related to a user;
receiving, from the machine learning model, a predetermined label and a value associated with the predetermined label wherein the value is associated with a location on the document, wherein: the machine learning model is initially trained using training data comprising labeled inputs, labeled outputs, and unlabeled data; the machine learning model groups the data of the unlabeled data into group clusters based on one or more patterns; and the machine learning model is subsequently trained using reinforcement learning to improve prediction accuracy of the machine learning model;
store the predetermined label and the value associated with the predetermined label in a structured data object;
identify, based a consistency rule, a logical inconsistency in the structured data object;
generate a visualization based on the logical inconsistency;
provide, at a display device, the structured data object, wherein the structured data object includes the visualization of the logical inconsistency;
store an identification inconsistency, where the identification inconsistency is identified when a confidence score generated by the machine learning model for a prestored location of a value associated a predetermined label in the structured data object is less than a first predetermined threshold and greater than a second predetermined threshold; and
receive, from the user, a selection of the location of the value associated with the predetermined label for the machine learning model and storing the value associated with the predetermined label.

12. The computer-readable medium of claim 11, wherein the instructions further cause the processor to:
generate a consistency rule when the user interacts with the visualization and selects a consistency resolution option; and
store the consistency rule and resolving a future inconsistency based on the consistency rule.

13. The computer-readable medium of claim 11, wherein the document is one of: a price quote document, an invoice document, and a delivery confirmation document.

14. The computer-readable medium of claim 11, wherein the consistency rule may include: comparing a quantity ordered with a quantity delivered, comparing a quoted price per unit to an invoiced price per unit, and comparing an invoiced price per unit to an industry average price per unit.

\* \* \* \* \*